United States Patent
Kasamatsu et al.

(10) Patent No.: US 11,161,357 B2
(45) Date of Patent: Nov. 2, 2021

(54) INFORMATION PROCESSING APPARATUS, PRINTING APPARATUS, INFORMATION PROCESSING METHOD, AND STORAGE MEDIUM

(71) Applicant: CANON KABUSHIKI KAISHA, Tokyo (JP)

(72) Inventors: Takehiko Kasamatsu, Fujisawa (JP); Yuki Igarashi, Tokyo (JP); Koji Suda, Kawasaki (JP); Fumikazu Nishikawa, Zushi (JP); Yasushi Morimoto, Kawasaki (JP); Keiko Harada, Tokyo (JP); Ryoma Ono, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 72 days.

(21) Appl. No.: 16/798,078

(22) Filed: Feb. 21, 2020

(65) Prior Publication Data

US 2020/0276835 A1   Sep. 3, 2020

(30) Foreign Application Priority Data

Feb. 28, 2019 (JP) .............................. JP2019-036835
Mar. 28, 2019 (JP) .............................. JP2019-063890
Mar. 29, 2019 (JP) .............................. JP2019-068050

(51) Int. Cl.
*B41J 11/00* (2006.01)
*B41J 2/045* (2006.01)

(52) U.S. Cl.
CPC ......... *B41J 11/009* (2013.01); *B41J 2/04556* (2013.01); *B41J 11/0095* (2013.01)

(58) Field of Classification Search
CPC ..... B41J 11/009; G06F 3/1204; G06F 3/1205; G06F 3/1256; G06F 3/1253
See application file for complete search history.

(56) References Cited

U.S. PATENT DOCUMENTS 10,730,293 B1 *   8/2020   Lin .................. G06N 20/00
2004/0113963 A1 *   6/2004   Tsujimoto .......... B41J 11/009
                                                    347/14

(Continued)

FOREIGN PATENT DOCUMENTS

EP          2309717 A2     4/2011
JP       2016-215590 A    12/2016

(Continued)

*Primary Examiner* — Julian D Huffman
(74) *Attorney, Agent, or Firm* — Canon U.S.A., Inc. IP Division

(57) ABSTRACT

An information processing apparatus includes an acquisition unit, a decision unit, a determination unit, and a change unit. The acquisition unit acquires a measurement result regarding a printing medium characteristic value. The decision unit decides a candidate for a printing medium type based on the acquired measurement result, and a reference characteristic value of each of printing media types set in advance to identify a type of the measured printing medium. Information associated with the printing medium type to be printed is input. The determination unit determines whether to change the reference characteristic value of the printing medium type associated with the input information based on the measurement result and the printing medium type associated with the input information. Wherein, when the determination unit determines to change the reference characteristic value, the change unit changes the reference characteristic value of the printing medium type based on the measurement result.

34 Claims, 31 Drawing Sheets

(56) References Cited

U.S. PATENT DOCUMENTS

| | | | |
|---|---|---|---|
| 2005/0031392 A1* | 2/2005 | Yamamoto | B41J 11/009 400/62 |
| 2005/0111015 A1 | 5/2005 | Tsujimoto | |
| 2007/0264039 A1* | 11/2007 | Saito | G06F 3/1226 399/81 |
| 2009/0296118 A1 | 12/2009 | Tsukamoto | |
| 2011/0063640 A1* | 3/2011 | Tanaka | H04N 1/6033 358/1.9 |
| 2015/0294200 A1* | 10/2015 | Ito | G06K 15/4065 358/1.15 |
| 2016/0031250 A1* | 2/2016 | Yokozawa | B41J 11/009 347/19 |
| 2016/0039234 A1* | 2/2016 | Hirai | G03G 15/50 347/5 |
| 2016/0044195 A1 | 2/2016 | Murrell | |
| 2016/0152052 A1 | 6/2016 | Namiki | |

FOREIGN PATENT DOCUMENTS

| | | | | |
|---|---|---|---|---|
| JP | 2016-215591 A | | 12/2016 | |
| KR | 20150118917 A | * | 10/2015 | ......... G06K 15/1823 |
| RU | 2231824 C2 | | 6/2004 | |

* cited by examiner

FIG. 7A

|  |  | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 95 | 94 | 100 | 95 | 85 | 90 |
|  | middle | 100 | 99 | 105 | 100 | 90 | 95 |
|  | max | 105 | 104 | 110 | 105 | 95 | 100 |
| DIFFUSED REFLECTION VALUE | min | 95 | 90 | 110 | 95 | 70 | 78 |
|  | middle | 100 | 95 | 115 | 100 | 75 | 83 |
|  | max | 105 | 100 | 120 | 105 | 80 | 88 |
| PAPER THICKNESS | min | 140 | 140 | 160 | 220 | 45 | 60 |
|  | middle | 190 | 190 | 210 | 270 | 95 | 110 |
|  | max | 240 | 240 | 260 | 320 | 145 | 160 |

FIG. 7B

|  |  | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 95 | 95 | 100 | 95 | 85 | 90 |
|  | middle | 100 | 100 | 105 | 100 | 90 | 95 |
|  | max | 105 | 105 | 110 | 105 | 95 | 100 |
| DIFFUSED REFLECTION VALUE | min | 95 | 91 | 110 | 95 | 70 | 78 |
|  | middle | 100 | 96 | 115 | 100 | 75 | 83 |
|  | max | 105 | 101 | 120 | 105 | 80 | 88 |
| PAPER THICKNESS | min | 140 | 149 | 160 | 220 | 45 | 60 |
|  | middle | 190 | 199 | 210 | 270 | 95 | 110 |
|  | max | 240 | 249 | 260 | 320 | 145 | 160 |

FIG. 8A
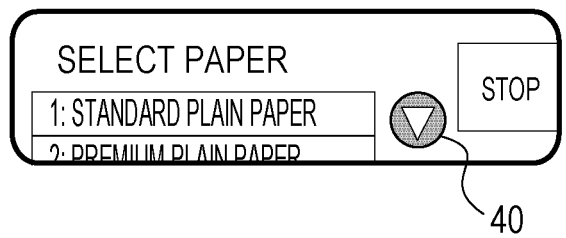
FIG. 8B
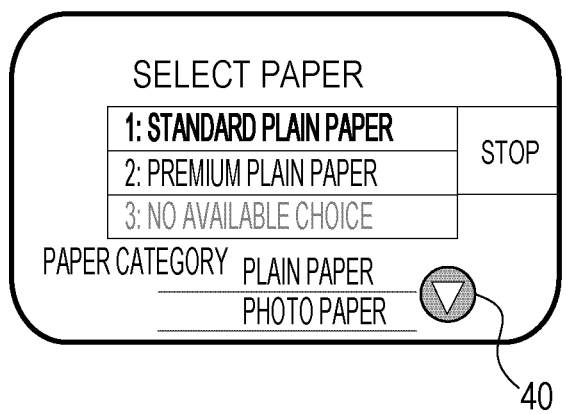
FIG. 8C
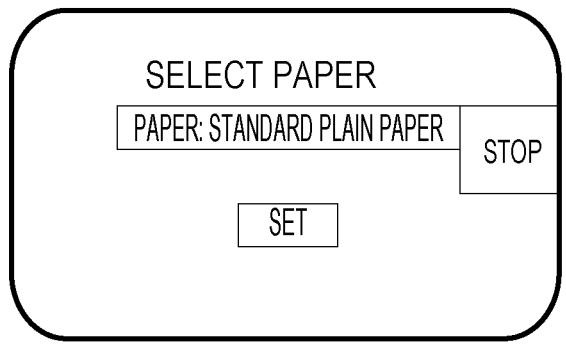
FIG. 9
| SPECULAR REFLECTION VALUE | 103 |
| --- | --- |
| DIFFUSED REFLECTION VALUE | 98 |
| PAPER THICKNESS | 225 |

FIG. 10

| | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| PAPER THICKNESS | APPLICABLE | APPLICABLE | APPLICABLE | APPLICABLE | NOT APPLICABLE | NOT APPLICABLE |
| DIFFUSED REFLECTION VALUE | APPLICABLE | APPLICABLE | NOT APPLICABLE | APPLICABLE | NOT DETERMINED | NOT DETERMINED |
| SPECULAR REFLECTION VALUE | APPLICABLE | APPLICABLE | NOT DETERMINED | APPLICABLE | NOT DETERMINED | NOT DETERMINED |

FIG. 11A

| | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.8 | NOT APPLICABLE | 0.6 | NOT APPLICABLE | NOT APPLICABLE |
| DIFFUSED REFLECTION VALUE | 0.4 | 0.6 | NOT APPLICABLE | 0.4 | NOT APPLICABLE | NOT APPLICABLE |
| PAPER THICKNESS | 0.7 | 0.7 | NOT APPLICABLE | 0.9 | NOT APPLICABLE | NOT APPLICABLE |
| TOTAL | 1.7 | 2.1 | | 1.9 | | |
| PRIORITY ORDER | 1 | 3 | | 2 | | |

FIG. 11B

| | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.4 | NOT APPLICABLE | 0.6 | NOT APPLICABLE | NOT APPLICABLE |
| DIFFUSED REFLECTION VALUE | 0.4 | 0.6 | NOT APPLICABLE | 0.4 | NOT APPLICABLE | NOT APPLICABLE |
| PAPER THICKNESS | 0.7 | 0.52 | NOT APPLICABLE | 0.9 | NOT APPLICABLE | NOT APPLICABLE |
| TOTAL | 1.7 | 1.52 | | 1.9 | | |
| PRIORITY ORDER | 2 | 1 | | 3 | | |

FIG. 12A

| SPECULAR REFLECTION VALUE | | STANDARD HALF-GLOSSY PAPER |
|---|---|---|
| | LAST MEASURED VALUE | 99 |
| | SECOND LAST MEASURED VALUE | 99 |
| | THIRD LAST MEASURED VALUE | 99 |
| | CHARACTERISTIC VALUE (AVERAGE VALUE) | 99 |

FIG. 12B

| SPECULAR REFLECTION VALUE | | STANDARD HALF-GLOSSY PAPER |
|---|---|---|
| | LAST MEASURED VALUE | 103 |
| | SECOND LAST MEASURED VALUE | 99 |
| | THIRD LAST MEASURED VALUE | 99 |
| | CHARACTERISTIC VALUE (AVERAGE VALUE) | 100.3 |

FIG. 12C

| SPECULAR REFLECTION VALUE | | STANDARD HALF-GLOSSY PAPER |
|---|---|---|
| | LAST MEASURED VALUE | 104 |
| | SECOND LAST MEASURED VALUE | 103 |
| | THIRD LAST MEASURED VALUE | 99 |
| | CHARACTERISTIC VALUE (AVERAGE VALUE) | 102 |

FIG. 12D

| SPECULAR REFLECTION VALUE | | STANDARD HALF-GLOSSY PAPER |
|---|---|---|
| | LAST MEASURED VALUE | 102 |
| | SECOND LAST MEASURED VALUE | 104 |
| | THIRD LAST MEASURED VALUE | 103 |
| | CHARACTERISTIC VALUE (AVERAGE VALUE) | 103 |

| HISTORICAL ORDER | |
|---|---|
| 1 | PREMIUM PLAIN PAPER |
| 2 | STANDARD HALF-GLOSSY PAPER |
| 3 | PREMIUM GLOSSY PAPER |
| 4 | THICK GLOSSY PAPER |
| 5 | STANDARD GLOSSY PAPER |
| 6 | STANDARD PLAIN PAPER |

FIG. 16A

| | | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| CORRECTION VALUE | SPECULAR REFLECTION VALUE | INDIVIDUAL | +1 | +2 | -5 | +2 | -1 | - |
| | | COMMON | | | +1 | | | |
| | DIFFUSED REFLECTION VALUE | INDIVIDUAL | +4 | -1 | -3 | +5 | -4 | - |
| | | COMMON | | | - | | | |
| | PAPER THICKNESS | INDIVIDUAL | +10 | +20 | -15 | -30 | +5 | - |
| | | COMMON | | | - | | | |

FIG. 16B

| | | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 97 | 97 | 96 | 98 | 85 | 91 |
| | middle | 102 | 102 | 101 | 103 | 90 | 96 |
| | max | 107 | 107 | 106 | 108 | 95 | 101 |
| DIFFUSED REFLECTION VALUE | min | 99 | 89 | 107 | 100 | 66 | 78 |
| | middle | 104 | 94 | 112 | 105 | 71 | 83 |
| | max | 109 | 99 | 117 | 110 | 76 | 88 |
| PAPER THICKNESS | min | 150 | 160 | 145 | 190 | 50 | 60 |
| | middle | 200 | 210 | 195 | 240 | 100 | 110 |
| | max | 250 | 260 | 245 | 290 | 150 | 160 |

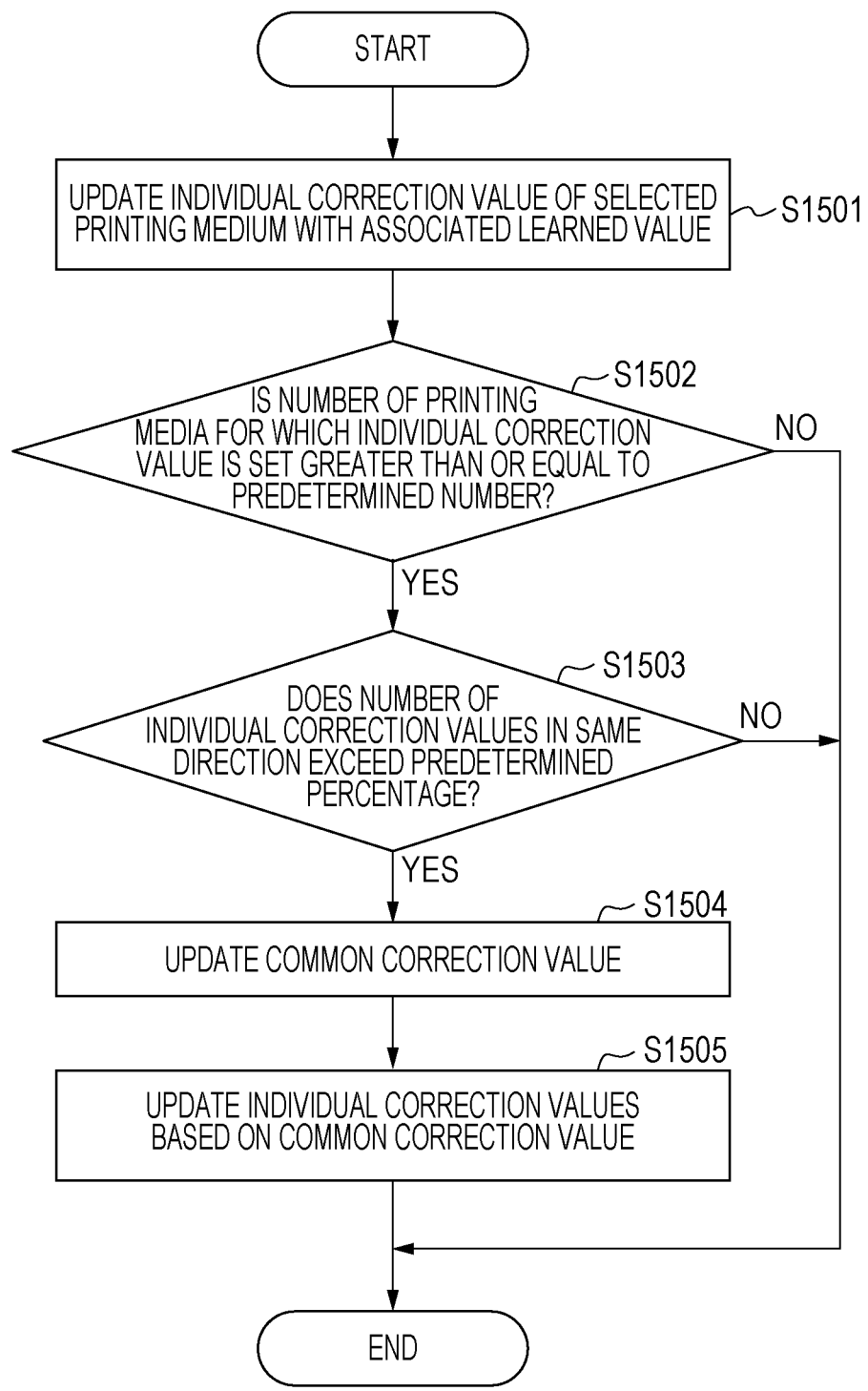

FIG. 18A

| CORRECTION VALUE | | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | INDIVIDUAL | +5 | +4 | +5 | -5 | – | – |
| | COMMON | | | | | | |
| DIFFUSED REFLECTION VALUE | INDIVIDUAL | +2 | +3 | -1 | +9 | – | – |
| | COMMON | | | – | | | |
| PAPER THICKNESS | INDIVIDUAL | +20 | +35 | -10 | -25 | – | – |
| | COMMON | | | – | | | |

FIG. 18B

| | | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| CORRECTION VALUE | SPECULAR REFLECTION VALUE - INDIVIDUAL | +1 | 0 | +1 | -9 | - | - |
| | SPECULAR REFLECTION VALUE - COMMON | +4 | | | | | |
| | DIFFUSED REFLECTION VALUE - INDIVIDUAL | 0 | +1 | -3 | +7 | - | - |
| | DIFFUSED REFLECTION VALUE - COMMON | +2 | | | | | |
| | PAPER THICKNESS - INDIVIDUAL | +20 | +35 | -10 | -25 | - | - |
| | PAPER THICKNESS - COMMON | - | | | | | |

FIG. 20A

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| SPECULAR REFLECTION VALUE V1L | V1L_a | V1L_b | V1L_c | V1L_d | V1L_e | V1L_f | V1L_g | V1L_h |
| DIFFUSED REFLECTION VALUE V2L | V2L_a | V2L_b | V2L_c | V2L_d | V2L_e | V2L_f | V2L_g | V2L_h |
| PAPER THICKNESS V3L | V3L_a | V3L_b | V3L_c | V3L_d | V3L_e | V3L_f | V3L_g | V3L_h |

FIG. 20B

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| SPECULAR REFLECTION CORRECTION VALUE α | α_a | α_b | α_c | α_d | α_e | α_f | α_g | α_h |
| DIFFUSED REFLECTION CORRECTION VALUE β | β_a | β_b | β_c | β_d | β_e | β_f | β_g | β_h |
| PAPER THICKNESS CORRECTION VALUE γ | γ_a | γ_b | γ_c | γ_d | γ_e | γ_f | γ_g | γ_h |
| SPECULAR REFLECTION LEARNING VALUE 1 v1_1 | v1_a1 | v1_b1 | v1_c1 | v1_d1 | v1_e1 | v1_f1 | v1_g1 | v1_h1 |
| SPECULAR REFLECTION LEARNING VALUE 2 v1_2 | v1_a2 | v1_b2 | v1_c2 | v1_d2 | v1_e2 | v1_f2 | v1_g2 | v1_h2 |
| DIFFUSED REFLECTION LEARNING VALUE 1 v2_1 | v2_a1 | v2_b1 | v2_c1 | v2_d1 | v2_e1 | v2_f1 | v2_g1 | v2_h1 |
| DIFFUSED REFLECTION LEARNING VALUE 2 v2_2 | v2_a2 | v2_b2 | v2_c2 | v2_d2 | v2_e2 | v2_f2 | v2_g2 | v2_h2 |
| PAPER THICKNESS LEARNING VALUE 1 v3_1 | v3_a1 | v3_b1 | v3_c1 | v3_d1 | v3_e1 | v3_f1 | v3_g1 | v3_h1 |
| PAPER THICKNESS LEARNING VALUE 2 v3_2 | v3_a2 | v3_b2 | v3_c2 | v3_d2 | v3_e2 | v3_f2 | v3_g2 | v3_h2 |

FIG. 20C

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| POSITIVE SPECULAR REFLECTION EXTRACTION LIMIT VALUE J1 | J1_a | J1_b | J1_c | J1_d | J1_e | J1_f | J1_g | J1_h |
| NEGATIVE SPECULAR REFLECTION EXTRACTION LIMIT VALUE J1' | J1'_a | J1'_b | J1'_c | J1'_d | J1'_e | J1'_f | J1'_g | J1'_h |
| POSITIVE SPECULAR REFLECTION LEARNING LIMIT VALUE L1 | L1_a | L1_b | L1_c | L1_d | L1_e | L1_f | L1_g | L1_h |
| NEGATIVE SPECULAR REFLECTION LEARNING LIMIT VALUE L1' | L1'_a | L1'_b | L1'_c | L1'_d | L1'_e | L1'_f | L1'_g | L1'_h |
| POSITIVE DIFFUSED REFLECTION EXTRACTION LIMIT VALUE J2 | J2_a | J2_b | J2_c | J2_d | J2_e | J2_f | J2_g | J2_h |
| NEGATIVE DIFFUSED REFLECTION EXTRACTION LIMIT VALUE J2' | J2'_a | J2'_b | J2'_c | J2'_d | J2'_e | J2'_f | J2'_g | J2'_h |
| POSITIVE DIFFUSED REFLECTION LEARNING LIMIT VALUE L2 | L2_a | L2_b | L2_c | L2_d | L2_e | L2_f | L2_g | L2_h |
| NEGATIVE DIFFUSED REFLECTION LEARNING LIMIT VALUE L2' | L2'_a | L2'_b | L2'_c | L2'_d | L2'_e | L2'_f | L2'_g | L2'_h |
| POSITIVE PAPER THICKNESS EXTRACTION LIMIT VALUE J3 | J3_a | J3_b | J3_c | J3_d | J3_e | J3_f | J3_g | J3_h |
| NEGATIVE PAPER THICKNESS EXTRACTION LIMIT VALUE J3' | J3'_a | J3'_b | J3'_c | J3'_d | J3'_e | J3'_f | J3'_g | J3'_h |
| POSITIVE PAPER THICKNESS LEARNING LIMIT VALUE L3 | L3_a | L3_b | L3_c | L3_d | L3_e | L3_f | L3_g | L3_h |
| NEGATIVE PAPER THICKNESS LEARNING LIMIT VALUE L3' | L3'_a | L3'_b | L3'_c | L3'_d | L3'_e | L3'_f | L3'_g | L3'_h |

INFORMATION PROCESSING APPARATUS, PRINTING APPARATUS, INFORMATION PROCESSING METHOD, AND STORAGE MEDIUM

BACKGROUND OF THE INVENTION

Field of the Invention

The present invention relates to an information processing apparatus, a printing apparatus, an information processing method, and a program.

Description of the Related Art

When printing is performed with a printing apparatus, it is known that printing is performed by using controlled parameters appropriate for a type of printing medium. Japanese Patent Laid-Open No. 2016-215591 describes that, in order to perform printing by using appropriate controlled parameters, a plurality of characteristic values of a printing medium to be printed is measured and the type of the printing medium is identified by making a comparison with reference values.

However, errors of a sensor that measures the characteristic values of a printing medium, individual differences among printing media, differences in measurement environment, and the like, influence measured values, so the type of a printing medium may not be identified with sufficient accuracy when references prepared in advance are used.

The present invention accurately identifies the type of a printing medium.

SUMMARY OF THE INVENTION

An information processing apparatus includes an acquisition unit, a decision unit, an input unit, a determination unit, and a change unit. The acquisition unit is configured to acquire a measurement result obtained by measuring a characteristic value of a printing medium with a measuring unit. The printing medium is to be printed with a printing unit. The decision unit is configured to decide a candidate for a type of the printing medium based on the measurement result of the printing medium, acquired by the acquisition unit, and a reference characteristic value of each of types of printing media set in advance to identify a type of the measured printing medium. The input unit is configured to input information associated with the type of the printing medium to be printed with the printing unit. The determination unit is configured to determine whether to change the reference characteristic value of the type of the printing medium associated with the information input by the input unit based on the measurement result of the printing medium and the type of the printing medium associated with the information input by the input unit. The change unit is configured to, when the determination unit determines to change the reference characteristic value of the type of the printing medium associated with the information input by the input unit, change the reference characteristic value of the type of the printing medium associated with the information input by the input unit based on the measurement result of the printing medium.

Further features of the present invention will become apparent from the following description of exemplary embodiments with reference to the attached drawings.

BRIEF DESCRIPTION OF THE DRAWINGS

FIG. 7A and FIG. 7B are tables showing characteristic values stored in an EEPROM in the first embodiment.

FIG. 8A to FIG. 8C are views showing other modes of the input/output unit.

FIG. 9 is a table showing an example of measured values that are measured in the first embodiment.

FIG. 10 is a table showing determination results in the printing medium determination process of the first embodiment.

FIG. 11A and FIG. 11B are tables showing priority assignment in the first embodiment.

FIG. 12A to FIG. 12D are tables for illustrating a method of calculating a characteristic value in the first embodiment.

FIG. 16A and FIG. 16B are tables showing correction values and corrected characteristic values in a fourth embodiment.

FIG. 17 is a flowchart showing a process of updating a correction value in the fourth embodiment.

FIG. 18A and FIG. 18B are tables showing correction values in the fourth embodiment.

FIG. 20A to FIG. 20C are tables showing characteristic values stored in an EEPROM in the fifth embodiment.

DESCRIPTION OF THE EMBODIMENTS

First Embodiment

Overall Configuration

Figure 1A:
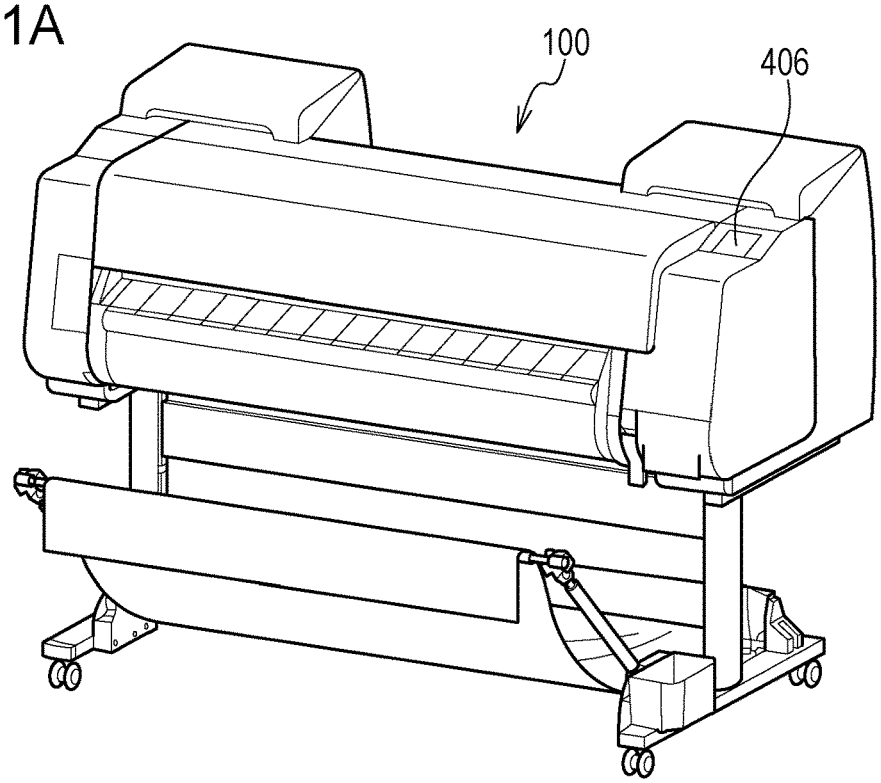
FIG. 1A and FIG. 1B are perspective views showing the configuration of a printing apparatus according to a first embodiment.
Figure 1B:
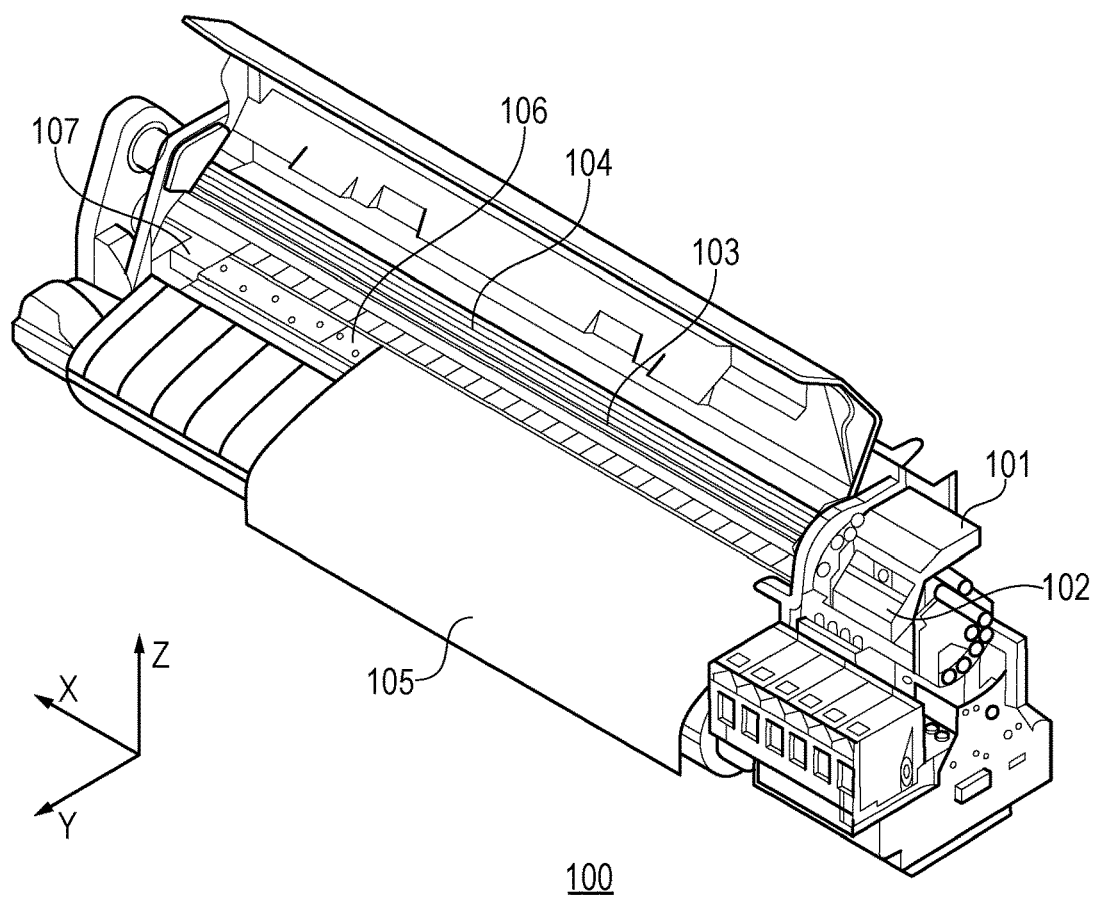

FIG. 1A and FIG. 1B are perspective views showing the configuration of a printing apparatus 100 equipped with casters and a basket for sheet discharge. FIG. 1A shows the overall outer appearance. FIG. 1B shows an internal structure with a top cover open. The printing apparatus 100 in the present embodiment prints by applying ink droplets as a recording agent onto a printing medium with an ink jet printing method. A printing medium is conveyed in a conveyance direction set to a Y direction. An ink jet printing apparatus including a so-called serial printing head will be described. With the serial printing head, a carriage 101 on which a printing head 102 is mounted prints while reciprocally moving in an X direction that intersects with the Y direction. Alternatively, an ink jet printing apparatus including a so-called line printing head may be used. With the line printing head, an array of nozzles is provided over a printing width for conveying a printing medium. Alternatively, a multifunctional peripheral apparatus (MFP) that integrates not only a printing function but also a scanning function, a facsimile function, a sending function, or the like, may be used. Alternatively, an electrophotographic printing apparatus that uses powder toner as a recording agent may be used. In the present embodiment, the function of an information processing apparatus for executing a process of determining a printing medium to be used (described later) is equipped for the printing apparatus 100.

The printing apparatus 100 has an input/output unit 406 at its top. The input/output unit 406 is an operation panel and shows an ink level and candidates for a type of a printing medium on a display. When a user operates keys on the input/output unit 406, the user is able to select a type of a printing medium or configure the settings for printing.

Figure 4:
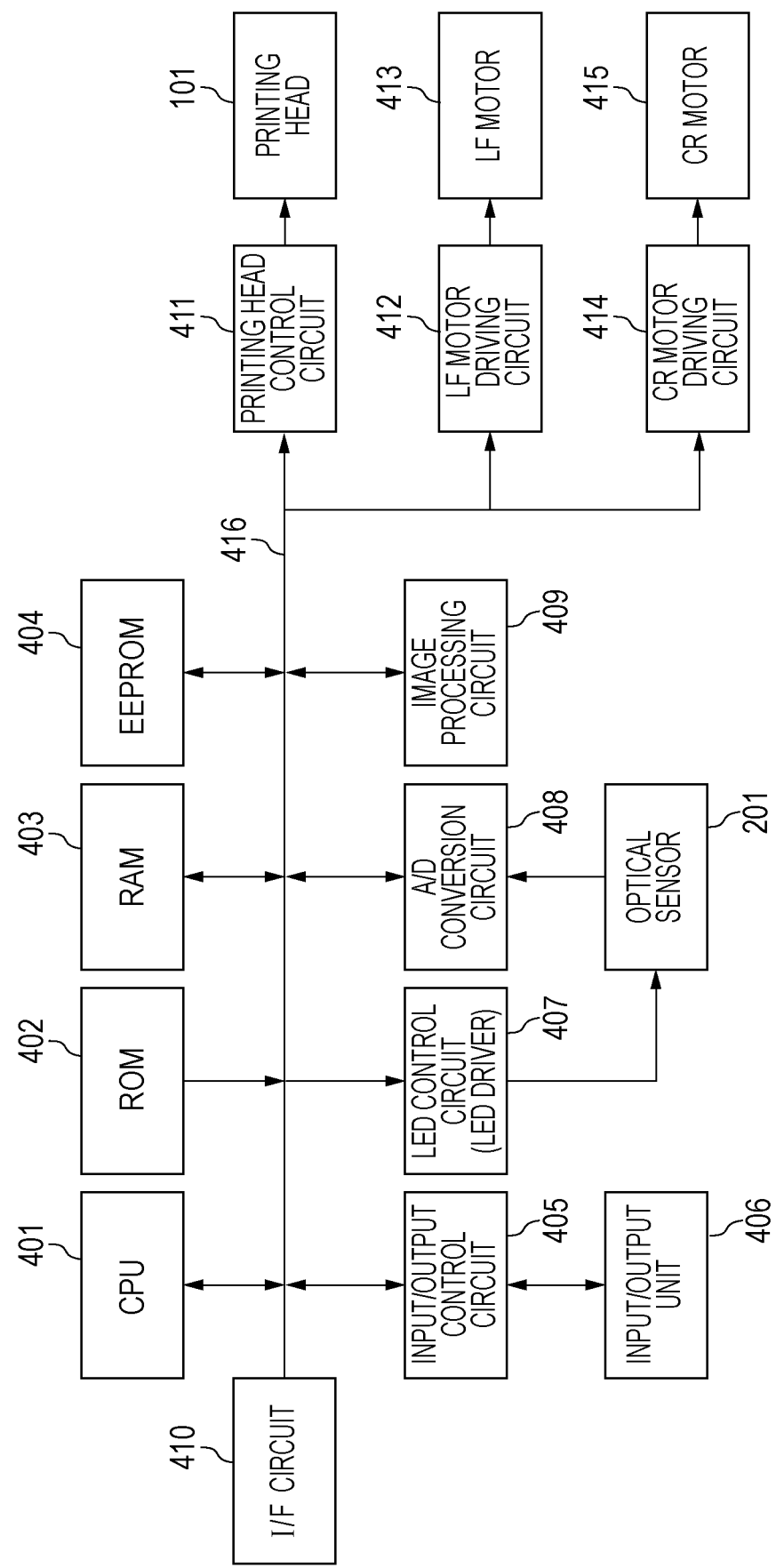
FIG. 4 is a diagram showing the block configuration of a control system of the printing apparatus in the first embodiment.

The carriage 101 includes an optical sensor 201 (FIG. 2) and the printing head 102. The printing head 102 has a discharge port face at which discharge ports for discharging ink are provided. The carriage 101 is configured to be reciprocally movable in the X direction (carriage moving direction) along a shaft 104 via a carriage belt 103 by being driven by a carriage motor 415 (FIG. 4). In the present embodiment, the printing apparatus 100 is able to acquire a diffused reflection characteristic value or a specular reflection characteristic value and measure a distance between the carriage 101 and a printing medium 105 with the use of the optical sensor 201.

The printing medium 105, such as rolled paper, is conveyed on a platen 106 in the Y direction by a conveyor roller (not shown). While the carriage 101 is moving in the X direction above the printing medium 105 conveyed on the platen 106 by the conveyor roller, ink droplets are discharged from the printing head 102. Thus, printing operation is performed. As the carriage 101 moves to an end of printing area on the printing medium 105, the conveyor roller conveys the printing medium 105 by a certain amount and moves the carriage 101 to a position at which the printing head 102 is able to print on an area to be subjected to the next scanning and printing. Through a repetition of the above-described operations, an image is printed.

Configuration of Carriage

Figure 2:
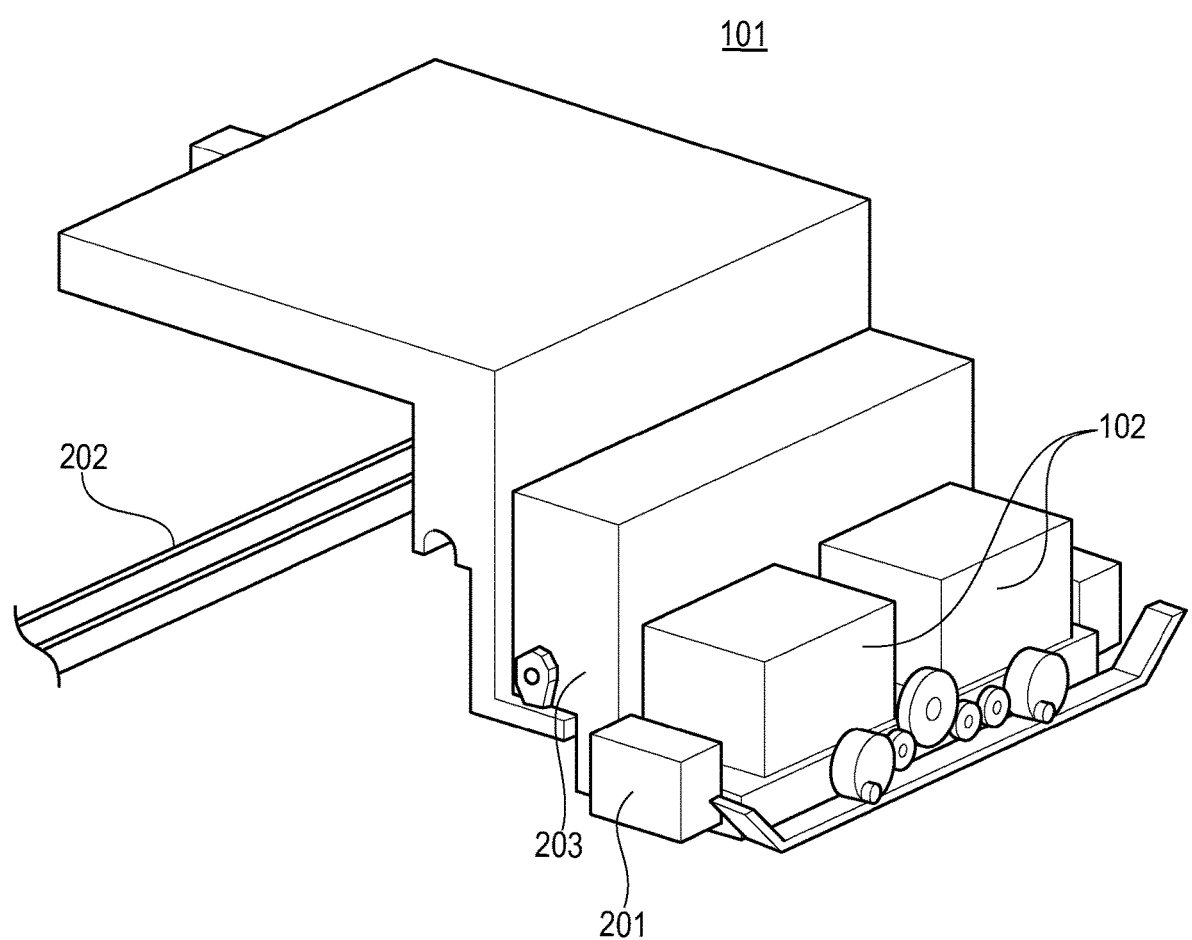
FIG. 2 is a view showing the configuration of a carriage according to the first embodiment.

FIG. 2 is a view that shows the configuration of the carriage 101. The carriage 101 includes a translator 202 and a head holder 203. The head holder 203 holds the printing head 102 and the optical sensor 201 that is a reflection sensor. As shown in FIG. 2, the optical sensor 201 is configured such that a bottom face is equal to or higher in level than the bottom face of the printing head 102.

Configuration of Optical Sensor

Figure 3:
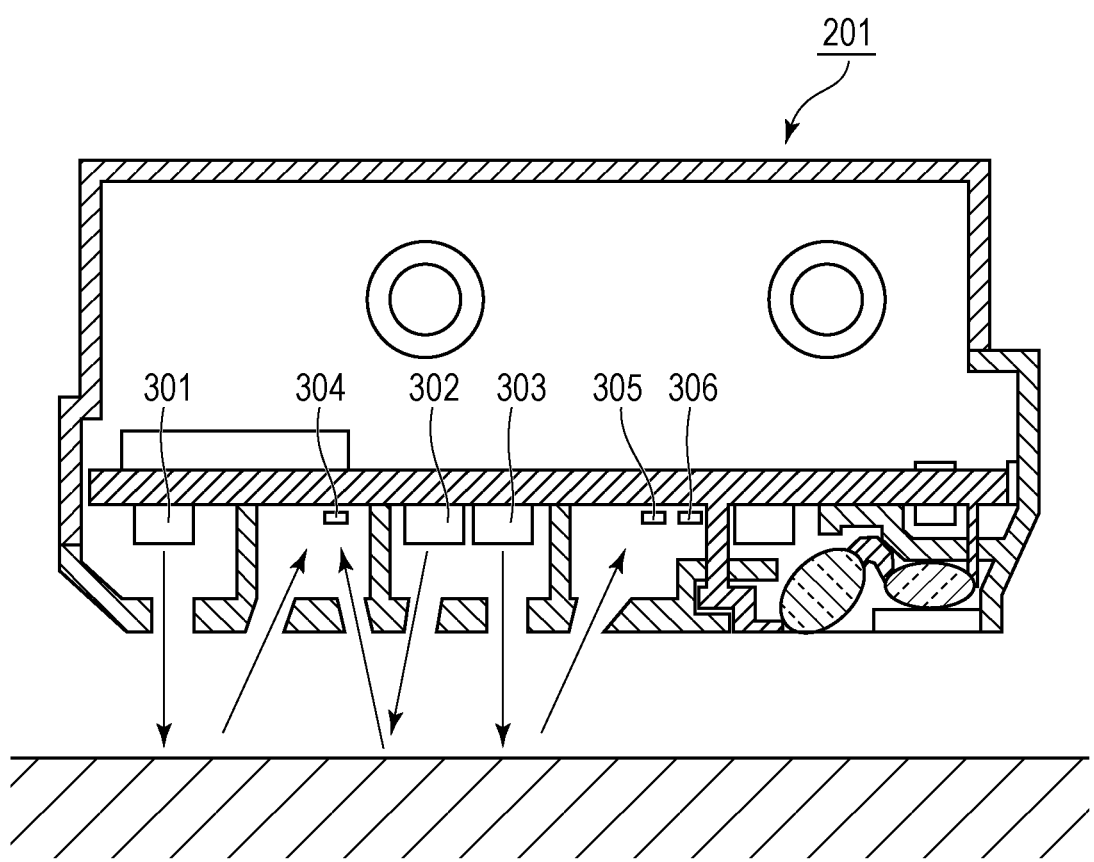
FIG. 3 is a view showing the configuration of an optical sensor in the first embodiment.

FIG. 3 is a schematic cross-sectional view showing the configuration of the optical sensor 201. The optical sensor 201 includes a first LED 301, a second LED 302, a third LED 303, a first photodiode 304, a second photodiode 305, and a third photodiode 306 as optical elements. The first LED 301 is a light source having an angle of irradiation of a normal line (90°) to the surface (measurement surface) of the printing medium 105. The first photodiode 304 receives light irradiated from the first LED 301 and reflected from the printing medium 105 at an angle of 45° with respect to the Z direction. In other words, an optical system that detects a so-called diffused reflection component of reflected light from the printing medium 105 is formed.

The second LED 302 is a light source having an angle of irradiation of 60° to the surface (measurement surface) of the printing medium 105 with respect to the Z direction. The first photodiode 304 receives light irradiated from the second LED 302 and reflected from the printing medium 105 at an angle of 60° with respect to the Z direction. In other words, an angle of emitting light and an angle of receiving light are equal to each other, and an optical system that detects a so-called specular reflection component of reflected light from the printing medium 105.

The third LED 303 is a light source having an angle of irradiation of a normal line (90°) to the surface (measurement surface) of the printing medium 105. The second photodiode 305 and the third photodiode 306 each receive light irradiated from the third LED 303 and reflected from the printing medium 105. The second photodiode 305 and the third photodiode 306 each operate as a range sensor that measures a distance between the optical sensor 201 and the printing medium 105 because the amount of light received changes with a distance between the optical sensor 201 and the printing medium 105.

In the present embodiment, the optical sensor 201 is installed on the carriage 101. An optical sensor may be provided in another mode. For example, an optical sensor may be fixed to the printing apparatus 100 or may be a measurement device for measuring a characteristic value, such as a diffused reflection value and a specular reflection value, of a printing medium, separated from the printing apparatus 100, and may be in a mode to send a characteristic value measured by the measurement device to the printing apparatus 100. In the present embodiment, the optical sensor 201 is installed on the carriage; however, another mode may be employed. For example, an optical sensor may be fixed to the printing apparatus 100 or may be a measurement device for measuring a characteristic value, such as a diffused reflection value and a specular reflection value, of a printing medium, separated from the printing apparatus 100, and may be in a mode to send a characteristic value measured by the measurement device to the printing apparatus 100.

Block Chart

FIG. 4 is a diagram showing the block configuration of a control system of the printing apparatus 100. A ROM 402 is a non-volatile memory. For example, a control program for controlling the printing apparatus 100 or a program for implementing the operations of the present embodiment are stored in the ROM 402. The operations of the present embodiment are, for example, implemented when the CPU 401 reads the program stored in the ROM 402 and runs the program by loading the program onto the RAM 403. The RAM 403 is also used as a working memory of the CPU 401. The EEPROM 404 stores data to be held even when the power of the printing apparatus 100 is turned off. At least the CPU 401 and the ROM 402 implement the function of the information processing apparatus for executing a printing medium determination process (described later). The EEPROM 404 stores characteristic values of each of printing media, which are used as predetermined references, and categories of the printing media. Categories are those roughly classified from types of printing media. In the present embodiment, five categories, that is, glossy paper, plain paper, coated paper, photo paper, and special, are set. For example, types of printing media are classified into a glossy paper category when a printing medium is standard glossy paper, and are classified into a plain paper when a printing medium is premium plain paper. Recording media also include a medium that is not a paper medium; however, in the present embodiment, the word "paper" is used and provided to a user. History information or characteristic values of printing media may be stored in not a storage medium in the printing apparatus 100 but an external memory, such as a ROM of a host computer and a server.

An interface (I/F) circuit 410 connects the printing apparatus 100 and a network, such as an external LAN. The printing apparatus 100 sends or receives various jobs, data, and the like, to or from an apparatus, such as an external host computer, through the I/F circuit 410.

The input/output unit 406 includes an input unit and an output unit. The input unit receives an instruction to turn on the power from a user, an instruction to perform printing, and an instruction to set various functions. The output unit displays various device information, such as power-saving mode, or a settings screen for various functions that the printing apparatus 100 is able to execute. In the present embodiment, the input/output unit 406 is the operation panel provided in the printing apparatus 100, and the input/output unit 406 is connected to a system bus 416 via an input/output control circuit 405 so as to be able to send or receive data to or from the system bus 416. In the present embodiment, the CPU 401 executes control to provide information about the output unit.

Alternatively, the input unit may be a keyboard of an external host computer and may be configured to be able to receive an instruction of a user from the external host computer. The output unit may be a display connected to an LED display, an LCD display, or a host apparatus. Alternatively, when the input/output unit 406 is a touch panel, the input/output unit 406 is able to receive an instruction from a user with a software key. Alternatively, the input/output unit 406 may be a speaker and a microphone, may use input from a user as voice input, and may use information to be provided to a user as voice output.

The information processing apparatus that includes a CPU and a ROM having similar functions to those of the CPU 401 and the ROM 402 and that is externally connected to the printing apparatus 100 may execute a printing medium determination process (described later) and determine a printing medium to be used in the printing apparatus 100.

When measurement is performed with the optical sensor 201, an LED control circuit 407 is driven by the CPU 401, and a predetermined LED in the optical sensor 201 is controlled so as to light up. Each of the photodiodes of the optical sensor 201 outputs a signal commensurate with received light. The output signal is converted to a digital signal by an A/D conversion circuit 408 and is once saved in the RAM 403. Data to be saved is stored in the EEPROM 404 when the power of the printing apparatus 100 is turned off.

The printing head control circuit 411 supplies a drive signal commensurate with printing data to a nozzle drive circuit including selectors and switches mounted on the printing head 102 and controls printing operation of the printing head 102, such as the driving sequence of nozzles. For example, when data to be printed is sent from the outside to the I/F circuit 410, the data to be printed is once saved in the RAM 403. The printing head control circuit 411 drives the printing head 102 based on printing data converted from data to be printed to printing data for printing. After that, an LF (line feed) motor drive circuit 412 drives an LF motor 413 based on the bandwidth of printing data, and the like, and a conveyor roller connected to the LF motor 413 rotates to convey a printing medium. A CR (carriage) motor drive circuit 414 causes the carriage 101 to scan via the carriage belt 103 by driving the CR (carriage) motor 415.

Data that is sent from the I/F circuit 410 contains not only data to be printed but also data of details set by a printer driver. Data to be printed can be, for example, received from the outside via the i/F circuit 410 and stored in a storage unit or stored in advance in a storage unit, such as a hard disk. The CPU 401 reads image data from the storage unit, controls an image processing circuit 409, and converts (binarizing process) the image data into printing data to use the printing head 102. The image processing circuit 409, other than the binarizing process, executes various image processing, color space conversion, HV conversion, gamma correction, and rotation of image.

Overall Flow

Figure 5:
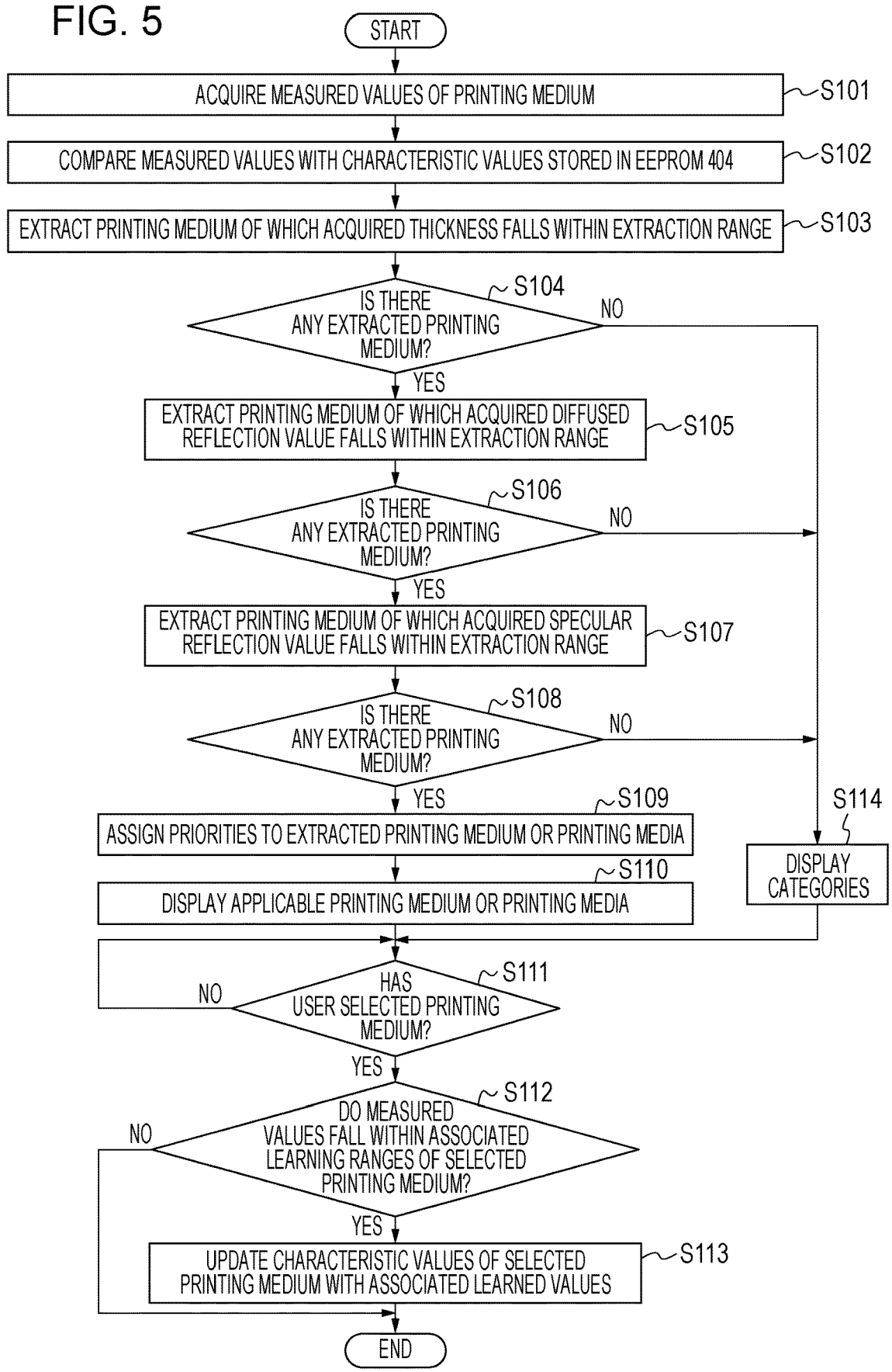
FIG. 5 is a flowchart showing a printing medium determination process in the first embodiment.

FIG. 5 is a flowchart showing the printing medium determination process of acquiring measurement results obtained by measuring the characteristic values of the printing medium 105 to be printed, providing candidates for a printing medium to the input/output unit 406 based on the measurement results and set reference characteristic values, and determining a type of the printing medium 105 to be printed. In the following printing medium determination process, measured values are obtained as new information for the characteristic values of a type of a printing medium, selected by a user, and characteristic values set in advance are changed based on the measured values so as to be brought close to the measured values. Through such learning, characteristic values with which a type of a printing medium can be more accurately selected are obtained.

The processes of step S101 to step S114 are implemented, for example, when the CPU 401 shown in FIG. 4 reads the program stored in the ROM 402 onto the RAM 403 and runs the program. The printing medium determination process may be executed by software on the host apparatus. In the present embodiment, since the input/output unit 406 is the operation panel provided in the printing apparatus 100, candidates for a printing medium are informed by displaying the names of printing media on the operation panel. The input/output unit 406 may be a combination of the host apparatus and the display connected to the host apparatus. When the input/output unit 406 is a speaker that has a microphone function and that is able to input or output voice, candidates for a printing medium are informed through the speaker, and a printing medium is selected by a user inputting the name of the printing medium or an associated reference sign by voice to the microphone.

Figure 6A:
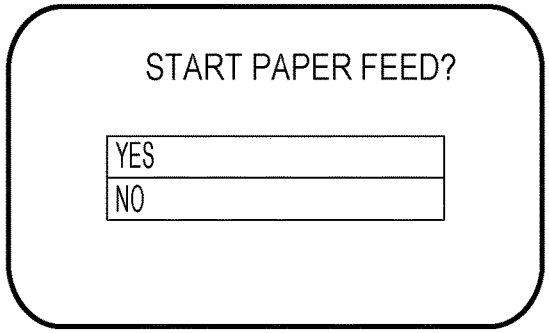
FIG. 6A to FIG. 6E are views showing display modes of an input/output unit in the first embodiment.

As the CPU 401 receives an instruction to start sheet feed from a user through the operation panel that is the input/output unit 406, the CPU 401 executes a process of feeding the printing medium 105. FIG. 6A is an example of display on the operation panel to wait for input of an instruction to start the sheet feed process. The operation panel is a touch panel with which a user is able to make touch input. When "YES" is touched, sheet feed is started.

When "YES" is selected in FIG. 6A and sheet feed is started, the printing medium 105 is conveyed by the conveyor roller to a position where the optical sensor 201 is able to detect the printing medium 105 on the platen 106. After the printing medium 105 is conveyed, the carriage 101 moves in the X direction above the printing medium 105, and the diffused reflection value, specular reflection value, and thickness (hereinafter, paper thickness) of the printing medium 105 are acquired with the optical sensor 201 (step S101). A diffused reflection value corresponds to the whiteness of a printing medium. A specular reflection value corresponds to the glossiness of a printing medium. The printing medium determination process may be executed by using the width of a printing medium in the X direction as one of the characteristics of the printing medium. A position where the characteristics of a printing medium are measured may be one, or an average of measurement results at multiple points may be used. Measurement of the characteristics may be performed in a state where the optical sensor 201 is stopped or may be performed while the optical sensor 201 is being moved. Measured values are once stored in a memory such as the RAM 403.

Subsequently, the CPU 401 reads the acquired measured values from the memory and compares the measured values with the predetermined characteristic values of various printing media, stored in the EEPROM 404 (step S102). Thus, a type of a printing medium of which a degree to which the characteristic values fall under the characteristics indicated by the measured values is higher than a predetermined degree is extracted. Details will be described below. FIG. 7A shows the characteristic values of each of the types of printing media, stored in the EEPROM 404. The characteristic values=$T_0$ when the characteristic values are initial values at the present. These values are set for reference values, and the type of the printing medium is identified by comparing the measured values with the reference values. The ranges of the reference values are defined as detection ranges. The detection ranges are extraction ranges for extracting a candidate for a printing medium to be informed to a user. Hereinafter, the detection ranges are referred to as extraction ranges. Diffused reflection values and specular reflection values are values obtained by converting an output voltage from analog to digital with 10 bits. The output voltage is a voltage that the optical sensor 201 outputs upon receiving light. Each extraction range is a range from a minimum value (min value) to a maximum value (max value) with a center set to a middle value of each of characteristic values of a printing medium. An extraction range of ±50 μm from a central value is set for paper thickness, and a type of a printing medium of which the acquired paper thickness falls within the extraction range is extracted (step S103).

It is determined whether there is any type of printing medium extracted (step S104).

Figure 6B:
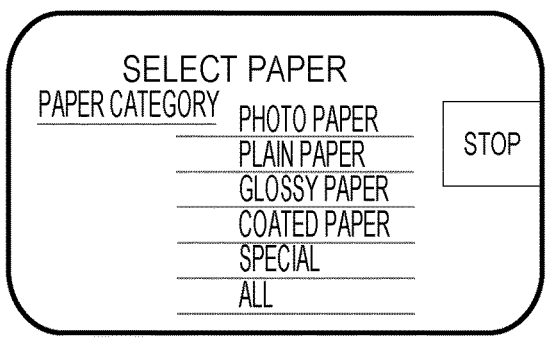
Figure 6C:
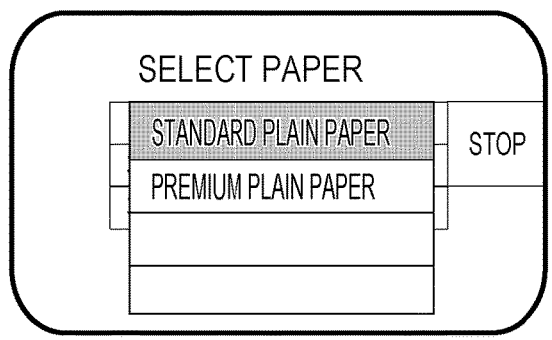

When there is no type of printing medium extracted, all the categories are displayed on the operation panel as shown in FIG. 6B (step S114). The categories are arranged in a predetermined order and displayed. In the case where the categories are displayed, when a category selected by a user is input, the types of printing media in the category are displayed as shown in FIG. 6C. Then, of the types of printing media displayed, input of the selected type of printing medium is received. The input is made by touching the name of the printing medium displayed. FIG. 6B shows "ALL" at the bottom in addition to the categories of printing media. When "ALL" is selected, all the printing media are displayed in a predetermined order. Recording media may be displayed in recent order, that is, in order from the latest used printing medium.

When there is a type of printing medium extracted in step S104, a type of printing medium of which the acquired diffused reflection value falls within the extraction range of diffused reflection value, stored in the storage unit (EEPROM) 404, is extracted (step S105). As shown in FIG. 7A, the extraction range of diffused reflection value is a range of ±5 from the central value. Here, it is determined whether there is a type of printing medium extracted (step S106). When there is no appropriate type of printing medium, categories are displayed on the operation panel as shown in FIG. 6B (step S114).

When there is a type of printing medium extracted in step S106, a type of printing medium of which the acquired specular reflection value falls within the extraction range of specular reflection value, stored in the storing unit (EEPROM) 404, is extracted (step S107). As shown in FIG. 7A, the extraction range of specular reflection value is a range of ±5 from the central value. Here, it is determined whether there is a type of printing medium extracted (step S108). When there is no appropriate type of printing medium, categories are displayed on the operation panel as shown in FIG. 6B (step S114).

When there is a type of printing medium extracted in step S108, the extracted type of printing medium is assigned with a priority such that a printing medium of which the characteristic values are closer to the measured values is set for a printing medium having a higher priority (step S109). A method of determining the order of display will be described in detail later.

Figure 6D:
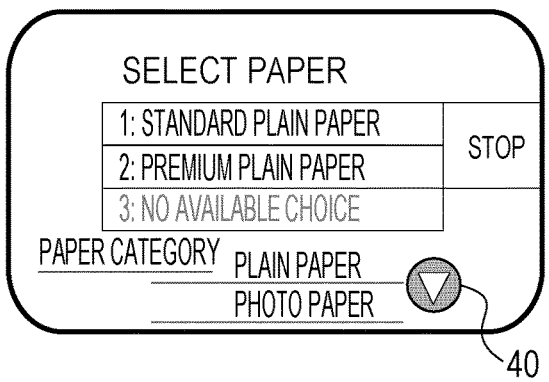

As shown in FIG. 6D, the names of the types of printing media are displayed from the top in descending order of priority determined in step S109 (step S110).

When an icon 40 displayed on the operation panel in FIG. 6D is touched, display of the screen can be scrolled downward. When "STOP" is touched, the printing medium determination process is cancelled, and display of FIG. 6A is switched to display of a home screen. FIG. 6D shows the names of printing media in descending order of priority with codes 1 to 3 prefixed to the names of printing media. Selection of a type of printing medium is made by touching any one of the names of printing media displayed. Here, the priority of standard half-glossy paper to which number 1 is assigned is the highest. Codes may be any codes as long as the codes can indicate the level of priority, and may be codes other than numerals. A display method is not limited thereto and may be any method as long as a user can recognize the order of priority.

In FIG. 6D, candidates for a printing medium can be displayed up to three from the top; however, since the number of the extracted types of printing media is two, only two printing media are displayed in FIG. 6D. A user is informed that there is no third candidate by displaying "NO AVAILABLE CHOICE" in the third field in light color (or dark color) so as to be less attractive than the names of the above-described two printing media. For example, when the background color of the operation panel is black, two printing media are displayed in white color and the text "NO AVAILABLE CHOICE" is displayed in gray color lower in brightness than white color. Categories of paper are displayed below the text "NO AVAILABLE CHOICE". In this way, when a printing medium that a user desires is not included in printing media displayed on the input/output unit 406, an individual printing medium is allowed to be selected in order to select a printing medium of another type. In the present embodiment, the category to which a type of printing medium in the first place belongs is displayed at the top. By displaying categories having close characteristics at higher levels to make it easy to select those categories, even when a printing medium that a user desires is not included in candidates for a printing medium, time and effort that take until the category of a desired printing medium is selected can be reduced.

FIG. 8A to FIG. 8C show methods of displaying candidates for a type of printing medium on the input/output unit 406 in other modes. As shown in FIG. 8A, when not all the candidates for a type of printing medium can be displayed on the operation panel, the input/output unit 406 may be configured such that a lower-level candidate can be displayed through scroll operation, or the like. Alternatively, candidates do not need to be displayed in order from the upper level as long as a user can recognize the order of priority. The name of the highest-level printing medium may be displayed at the center of the operation panel. Alternatively, as shown in FIG. 8B, the level of priority may be indicated by increasing the size of characters representing the name of a printing medium having a higher level of priority or displaying the characters in boldface. Categories are displayed below the text "PAPER CATEGORY"; however, categories may be displayed without any text meaning "PAPER CATEGORY". Alternatively, not categories but types of printing media other than candidates for a printing medium may be displayed below the candidates.

Alternatively, as shown in FIG. 8C, only a printing medium having a priority in the first place may be displayed. When a user desires to select another one of extracted printing media, the user can select a portion of the item of the printing medium displayed as standard plain paper in FIG. 8C. A display method may be configured such that, when the selection is input, the screen appears as shown in FIG. 6D and another printing medium can be selected.

When there is no type of printing medium extracted in step S108, only categories are displayed as shown in FIG. 6B (step S114).

When a user selects a type of printing medium on the input/output unit 406 in step S111, it is determined in step S112 whether the measured values fall within the learning ranges of the selected printing medium. The learning ranges will be described here. If learning is performed based on a measured value significantly different from a characteristic value set in advance (or changed through a learning process), a wrong value is learned, so a learning range that is the range of a measured value to be learned is set. A learning range is twice as large as an extraction range in the present embodiment. A learning range is a range for changing a characteristic value. When a measured value falls within the learning range of a selected printing medium, the characteristic value is changed based on the measured value. In the present embodiment, a learning range is a range of a predetermined value from the central value of a characteristic value and is a range of a value twice as large as the difference between the central value and the minimum value or the difference between the central value and the maximum value. For example, the extraction range of specular reflection value of standard glossy paper in FIG. 7A is from 95 to 105, that is, ±5 from the central value. Since the learning range takes on a range of ±10 from the central value, that is, twice as large as ±5, the learning range is from 90 to 110.

Similarly, a diffused reflection value and a paper thickness each also take on a range twice as wide as the extraction range, so the learning range of diffused reflection value of standard glossy paper is from 90 to 110, and the learning range of paper thickness is from 90 to 290. The learning range is not limited thereto and may take on, for example, the same range as the extraction range or may be set to a learning range that varies among characteristics or types of printing media. When the measured values fall within the learning ranges of the selected type of printing medium, the process proceeds to step S113. In step S113, the characteristic values of the type of printing medium, selected in step S111, are updated with values changed based on the measured values, and the changed values are stored in the EEPROM 404. As described above, the printing medium determination process ends. When the measured values do not fall within the learning ranges, the printing medium determination process is ended without updating the characteristic values of the selected type of printing medium. An update of characteristic values will be described in detail later.

When the printing medium determination process ends and a printing preparation completes, the CPU 401 is in a state of waiting for a printing job from a user, and, upon receiving a printing job, starts printing. When the type of printing medium selected and input by a user from the input/output unit 406 is different from the type of printing medium in a job sent from a host computer to the printing apparatus 100, the CPU 401 may be configured not to update the characteristic values of the printing medium, stored in the EEPROM 404.

In the printing medium determination process of FIG. 5, a type of print medium having an appropriate paper thickness is extracted in step S103, a type of print medium having an appropriate diffused reflection value is extracted in step S105, and a type of printing medium having an appropriate specular reflection value is extracted in step S107. The sequence to be extracted is not limited thereto, and, for example, a type of printing medium having an appropriate diffused reflection value may be extracted first.

When the optical sensor 201 is provided in a measurement device separated from the printing apparatus 100, the following mode is applicable. The characteristics of a printing medium set in the measurement device are measured first. Then, the acquired measured values are sent to the printing apparatus 100, a printing medium is extracted by the CPU 401 of the printing apparatus 100, and a candidate is provided to the input/output unit 406.

A method of determining the order of display of step S110 of the printing medium determination process and an update of the characteristic values of step S113 will be described below by way of a specific example. As shown in FIG. 9, the characteristics of the printing medium acquired in step S101 are (diffused reflection value, specular reflection value, paper thickness)=(103, 98, 225). FIG. 10 is a table showing determination results of the processes of step S103 to step S107. "APPLICABLE" represents a printing medium of which the measured value falls within the extraction range. "NOT APPLICABLE" represents a printing medium of which the measured value does not fall within the extraction range. A printing medium of which at least one of characteristic values does not fall within the extraction range is not subjected to determination in the next process. This is shown in FIG. 10 as "NOT DETERMINED".

In step S103, standard glossy paper, standard half-glossy paper, premium glossy paper, and thick glossy paper, which are the types of printing media of which the acquired paper thickness (here, 190) falls within the extraction range of paper thickness shown in FIG. 7A, are extracted. Since there are the extracted types of printing media, affirmative determination is made in step S104, and the process proceeds to step S105.

In step S105, from among the printing media extracted in step S103, standard glossy paper, standard half-glossy paper, and thick glossy paper, which are the types of printing media of which the measured diffused reflection value (here, 103) falls within the extraction range of diffused reflection value shown in FIG. 7A, are extracted. Since there are the extracted types of printing media, affirmative determination is made in step S106, and the process proceeds to step S107.

In step S107, from among the printing media extracted in step S105, printing media of which the measured specular reflection value (here, 98) falls within the extraction range of specular reflection value shown in FIG. 7A, are extracted. Here, standard glossy paper, standard half-glossy paper, and thick glossy paper are extracted. Since there are the extracted printing media, affirmative determination is made in step S108, and the process proceeds to step S109.

In step S109, the printing media are assigned with priorities such that the printing medium of which the characteristic values are closer to the measured values has a higher order of priority. Then, in step S110, the names of the extracted types of printing media are displayed from the top in order from the printing medium having a higher order of priority.

FIG. 11A and FIG. 11B are tables for illustrating a method of determining the order in step S109. In the present embodiment, the closeness between the central value and measured value of each characteristic is calculated with the following calculation method.

|(Measured value−Central value of characteristic)/
(Maximum value of characteristic−Central value
of characteristic)|

A minimum value may be used instead of the maximum value of the characteristic.

Figure 6E:
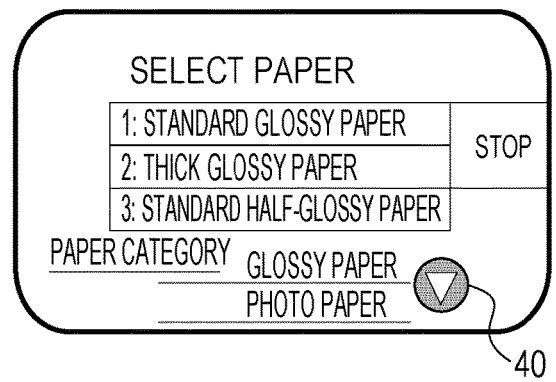

For example, when the specular reflection value of standard glossy paper is calculated, |(103−100)/(105−95)|=0.6. The above-described calculation is performed for the types of printing media extracted in step S105, and the values of closeness to the measured values of the characteristics are added. A printing medium having a less total value has characteristic values closer to the measured values. It is determined that a printing medium having a less total value is a type of a higher-level printing medium, and display is performed on the input/output unit 406 accordingly. Here, as shown in FIG. 6E, display is performed in order of standard glossy paper, thick glossy paper, and standard half-glossy paper.

The process of step S112 in the case where standard half-glossy paper that is displayed in the third place is selected by a user in step S111 will be described.

In step S112, it is determined whether the measured values acquired in step S101 fall within the learning ranges of standard half-glossy paper that is the selected type of printing medium. When the measured values fall within the learning ranges of all the characteristics, that is, diffused reflection value, specular reflection value, and paper thickness, it is determined that the measured values fall within the learning ranges of standard half-glossy paper. As shown in FIG. 7A, the extraction range of specular reflection value of standard half-glossy paper is from 94 to 104 that is a range of ±5 from the central value (middle) set to 99. As described above, the learning range takes on a range twice as wide as the extraction range from the same central value as the extraction range. The learning range of specular reflection value of standard half-glossy paper is from 89 to 109 that is a range of ±10 from the central value set to 99. Similarly, the learning range of diffused reflection value of standard half-glossy paper is from 85 to 105, and the learning range of paper thickness is from 90 to 290. Since all the measured values (diffused reflection value, specular reflection value, paper thickness)=(103, 98, 225) fall within the above-described learning ranges, the process proceeds to step S113.

In step S113, the characteristic values of the type of printing medium selected are updated based on the measured values. The characteristic values shown in FIG. 7A are characteristic values before update. FIG. 9 shows measured values. In the present embodiment, the characteristic values of the type of printing medium are brought close to the measured values by a set percentage. Because the measured values contain measurement errors, the characteristic values may be rather changed such that the differences between the measured values and the characteristic values are reduced in a stepwise manner through learning multiple times, that is, the differences reduce by a set percentage, than the characteristic values are directly replaced with the measured values at a time. One example of that is expressed by a generalized formula as follows.

Updated characteristic values $(T_{n+1})$=(Measured values $(R)$−Characteristic values $(T_n)$)×α+Pre-updated characteristic values $(T_n)$ Here, α is a value that indicates a percentage by which characteristic values are brought close to measured values. When the percentage of reduction in difference is set to 25%, the central value of specular reflection value is as follows. For example, when $T_n=T_0$ (initial value), $T_1$ is found through the first update.

When R=103 and $T_n=T_0=99$, $T_1$ is found as follows.

$T_1=(103-99)\times0.25+99=100$

Similarly, the characteristic values of diffused reflection value and paper thickness are updated. The updated results are shown in FIG. 7B. The fact that the extraction ranges of specular reflection value and diffused reflection value each are ±5 from the central value and the extraction range of paper thickness is ±50 from the central value remains unchanged, and minimum values and maximum values are also updated according to central values. The original characteristic values are overwritten with the updated characteristic values. The updated characteristic values are stored as the characteristic values of standard half-glossy paper in the EEPROM 404, and used in subsequent printing medium determination processes. Thus, the printing medium determination process ends.

In the above-described example, when the characteristic values are updated, the characteristic values are bought close to the measured values by 25%; however, the percentage of reduction in difference is not limited thereto and may be a percentage higher than 0% and lower than or equal to 100%. The percentage of reduction in difference may be set for each type of printing medium or may be set for each characteristic.

In a state where the characteristic values are updated as shown in FIG. 7B, standard half-glossy paper of which the characteristics of a printing medium are (diffused reflection value, specular reflection value, paper thickness)=(103, 98, 225) is measured again. The results of priority assignment in order of closeness of the characteristic values to the measured values are shown in FIG. 11B. As a result of the update of the characteristic values of standard half-glossy paper, standard half-glossy paper is ordered in the first place. Therefore, in step S110, standard half-glossy paper that is the measured printing medium is displayed on the input/output unit 406 as the highest-level printing medium, and a user can more easily select the printing medium.

Alternatively, as another method of incorporating measured values into characteristic values of a type of printing medium, an average value of last N measured values may be set as each characteristic value. FIG. 12A to FIG. 12D are tables for illustrating a method of setting a characteristic value by using last three measured values. Here, the specular reflection value of standard half-glossy paper will be described as an example. FIG. 12A shows the case where standard half-glossy paper is not selected even once in step S111 or step S114. In FIG. 12A, 99 that is an initially set value is input as last three values, and the average value is also 99, so the characteristic value is 99. In FIG. 12B, when standard half-glossy paper is selected, the measured value 103 is input as the last measured value. The average value 100.3 at the time when the measured value 103 is input is set as the characteristic value that is used subsequently. FIG. 12C shows the case where standard half-glossy paper is further selected, and 104 is input as the last measured value. The average value at this time, that is, 102, is set as the characteristic value to be used subsequently. FIG. 12D shows the case where standard half-glossy paper is further selected in the state of FIG. 12C, and 102 is input as the last measured value. The average value 103 at this time is set as the characteristic value to be used subsequently.

As described above, measured values of a fed printing medium are acquired, and a type of printing medium of which the characteristic values are closer to the measured values is informed at a higher level. With this configuration, a type of printing medium that a user is more likely to select is preferentially informed, so time and effort at the time of selecting a type of printing medium that a user desires can be reduced.

Second Embodiment

In the first embodiment, extracted types of printing media are informed in order of closeness of characteristic values to measured values. In the present embodiment, the order of informing is determined based on history information.

In the present embodiment, the EEPROM 404 stores a history of types of printing media, fed and selected by a user so far. The printing media selected by a user are the printing media selected in step S111 of FIG. 5 of the first embodiment. The stored information is treated as history information.

Figure 13:
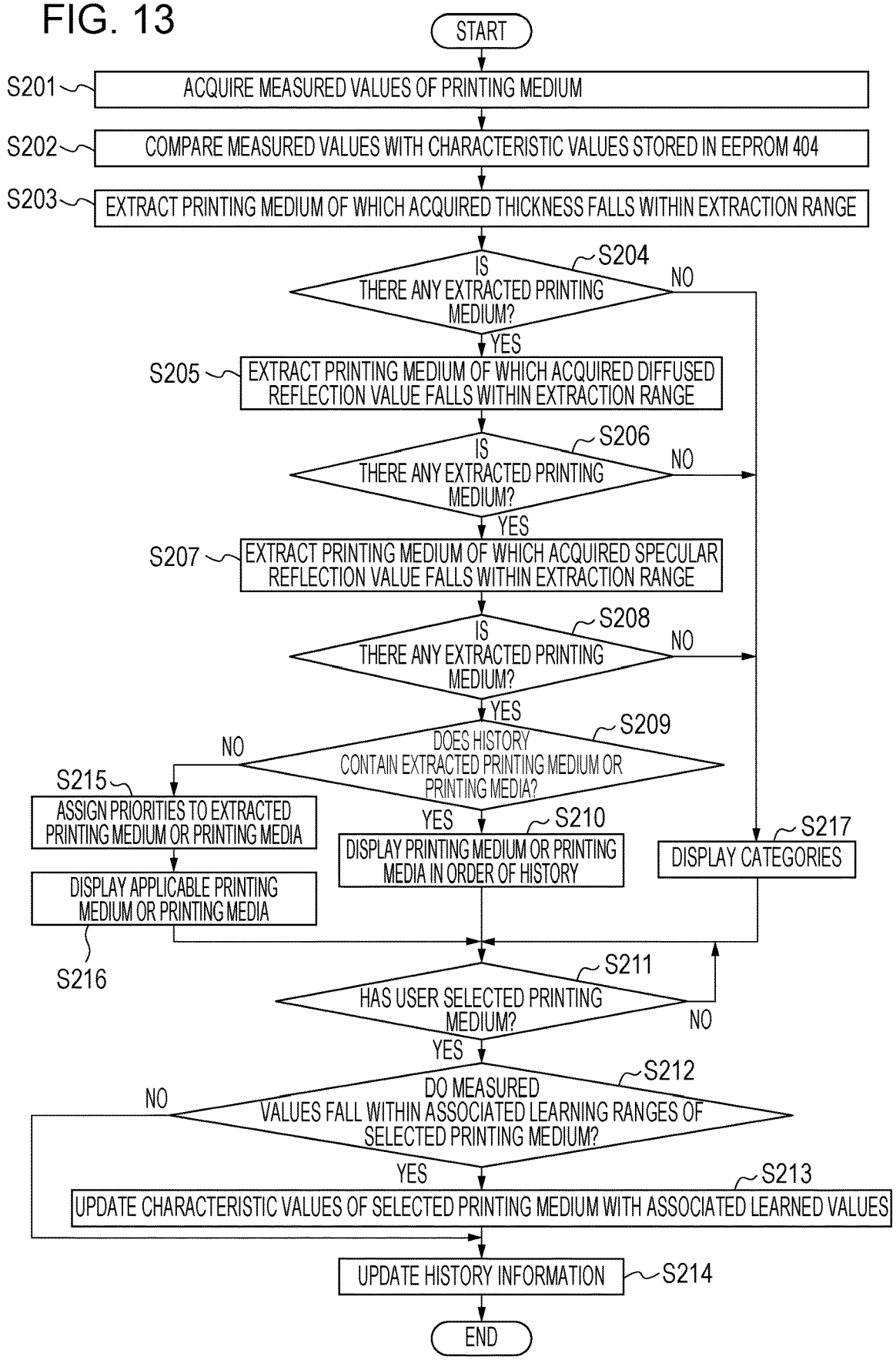
FIG. 13 is a flowchart showing a printing medium determination process in a second embodiment.

FIG. 13 shows a flowchart of a printing medium determination process of the present embodiment. Similar processes are executed in step S201 to step S208, and step S217 in FIG. 13 to those of step S101 to step S108, and step S114 in FIG. 5 of the first embodiment.

Figures 14, 15:
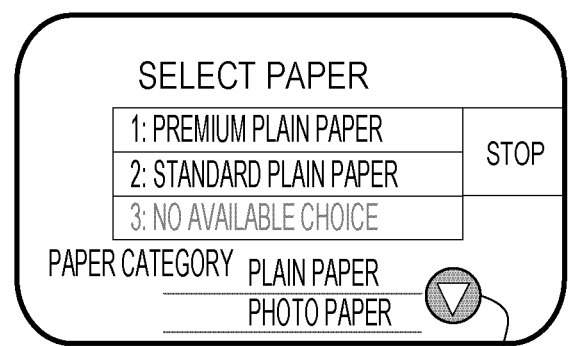
FIG. 14 is a table showing history information in the second embodiment.
FIG. 15 is a view showing a display mode of an input/output unit in the second embodiment.

In step S209, it is determined whether the extracted type of printing medium is included in a usage history based on the history information stored in the EEPROM 404. The EEPROM 404 stores printing media used in the printing apparatus 100 so far in association with information indicating the closeness of timing used as shown in FIG. 14. When a printing medium of the same type is used multiple times, only information about the last usage is entered into the history. FIG. 14 shows that a printing medium of which a number assigned to the field of historical order is smaller is a more recently used printing medium.

When the type of printing medium extracted in step S209 is not included in the history information, the extracted type of printing medium is assigned with a priority in step S215 as in the case of step S109 of FIG. 5 such that a printing medium of which the characteristic values are closer to the measured values is set for a printing medium having a higher order of priority.

In step S216, the names of printing media are displayed in order on the operation panel as shown in FIG. 6D in accordance with the order of priority determined in step S215, and the process proceeds to step S211.

When the type of printing medium extracted in step S209 is included in the history information, the extracted type of printing medium is displayed in step S210 such that printing media of the same type are collectively displayed as one as shown in FIG. 15. In FIG. 15, the types of printing media used so far are displayed such that a more recently used printing medium is a printing medium having a higher order of priority and the name of printing medium having a higher order of priority is displayed in order from the top. Here, the names of printing media of three types can be displayed; however, only printing media of two types extracted and included in the history information are displayed. In this case, information indicating that there is no history information like "NO AVAILABLE CHOICE" is displayed in the third field.

Similar processes are executed in step S211 to step S213 to those of step S111 to step S113 in FIG. 5. When a user selects a type of printing medium on the input/output unit 406 in step S211, it is determined in step S212 whether measured values fall within the learning ranges of the selected printing medium. When the measured values do not fall within the learning ranges of the selected printing medium, the process proceeds to step S214. When the measured values fall within the learning ranges of the selected printing medium, the characteristic values of the selected printing medium are changed and updated based on the measured values in step S213.

Subsequently, in step S214, the history information is updated with information in which the selected type of printing medium is entered into the latest usage history. Thus, the printing medium determination process of the present embodiment ends.

When the measured values do not fall within the learning ranges of the selected printing medium (NO in step S212), the CPU 401 may be configured not to update the history information in step S214.

As described above, in the present embodiment, types of printing media that have been used before are informed as higher-level candidates. With this configuration, a printing medium of a type that a user is more likely to use is preferentially informed, so time and effort at the time of selecting a printing medium that a user desires can be reduced.

Third Embodiment

In the first embodiment, characteristic values of types of printing media, stored in the EEPROM 404, are directly corrected, and the corrected characteristic values are compared with measured values. In the present embodiment, correction values are provided in addition to characteristic values of types of printing media, stored in the EEPROM 404. Correction values are updated through learning, but characteristic values are not changed from $T_0$ that are initial values. Values obtained by correcting the characteristic values $T_0$ with the correction values $C_n$ are used as reference characteristic values and are compared with measured values. Correction values take on $C_0$ as initial values and the nth correction values are $C_n$. Similar portions to those of the first embodiment are omitted.

In a printing medium determination process of the present embodiment, similar processes to those of the first embodiment are executed in step S101, step S103 to step S112, and step S114 in FIG. 5. Here, step S102 and step S113 will be mainly described.

In addition to characteristic values of types of printing media, correction values for correcting the characteristic values are stored in the EEPROM 404. At the time of making a comparison with measured values, corrected characteristic values are calculated based on predetermined characteristic values shown in FIG. 7A and correction values and compared with the measured values. In the present embodiment, reference characteristic values at the time of making a comparison with measured values are set to $T_0+C_n$ that are obtained by adding the characteristic values $T_0$ and the correction values $C_n$.

In step S102, the measured values acquired in step S101 are compared with the corrected characteristic values of the types of printing media. The processes of step S103 to step S112 are executed by using the reference characteristic values $T_0+C_n$ calculated in step S102.

In step S113, the correction values for the characteristic values of the printing medium selected by a user are updated with learned values. The correction values are updated such that the corrected characteristic values of the type of printing medium are brought close to the measured values by a set percentage. This example is expressed as follows by a generalized formula. α indicates a percentage of reduction in difference.

Updated correction values $(C_{n+1})$=(Measured values
$(R)$–Reference characteristic values $(T_0+C_n)$)×
α+Pre-updated correction values $(C_n)$ Fourth Embodiment In the above-described embodiment, characteristic values at the time of making a comparison with measured values are corrected through learning for a selected type of printing medium, and printing media not selected by a user are not corrected through learning at that time. In the present embodiment, when it is determined that characteristic values vary depending on the individual difference of an optical sensor and an environment in which the apparatus is installed, characteristic values of non-selected types of printing media are also corrected. The present embodiment will be described as a mode in which characteristic values are not changed from the initial values $T_0$ as in the case of the third embodiment and correction values for correcting the characteristic values of types of printing media are provided. Similar portions to those of the above-described embodiment are omitted.

Individual correction values for each of types of printing media and common correction values for commonly correcting the characteristic values of all the types of printing media are stored in the EEPROM 404. An example of stored correction values is shown in FIG. 16A. As shown in FIG. 16A, individual correction values for each of types of printing media are set. Premium plain paper has not been selected as a printing medium for use, so no correction values are set. Common correction values are set for a specular reflection characteristic, but no common correction values are set for a diffused reflection characteristic or a paper thickness characteristic.

Corrected characteristic values obtained by correcting the characteristic values of printing media shown in FIG. 7A with the correction values of FIG. 16A are shown in FIG. 16B. A corrected specular reflection value of standard glossy paper is from 97 to 107, obtained by adding an individual correction value of +1 and a common correction value of +1 to the range of 95 to 105 that is a reference specular reflection value of standard glossy paper. A corrected diffused reflection value of standard glossy paper is from 99 to 109, obtained by the addition of an individual correction value of +4. In the present embodiment, results obtained by adding the reference characteristic values, individual correction values, and common correction values of each printing medium are described as corrected characteristic values; however, corrected reference values may be calculated with a method other than addition. For example, individual correction values and common correction values may be saved as coefficients, and values obtained by multiplying reference characteristic values of a printing medium by the individual correction values and the common correction values may be used as corrected reference values.

In the process of generating correction values in step S113 of FIG. 5 of the first embodiment, individual correction values and common correction values are generated in the present embodiment. FIG. 17 shows a flowchart of the process of generating correction values of the present embodiment.

In step S1501, the individual correction values for the characteristic values of the printing medium selected by a user are updated with learned values. The individual correction values are updated such that the corrected characteristic values of the type of printing medium are brought close to the measured values by a set percentage. A similar process to the process described in step S113 of FIG. 5 of the second embodiment is executed.

In step S1502, it is determined whether the number of types of printing media for which individual correction values are set is greater than or equal to a predetermined number. When the number of types of printing media for which individual correction values are set is greater than or equal to the predetermined number, whether there is a common tendency in correction can be determined based on the individual correction values, so the process proceeds to step S1503. When the number of types of printing media for which individual correction values are set is not greater than or equal to the predetermined number, whether there is a common tendency in correction cannot be determined because the number of types for which individual correction values are set is small, so the process is ended.

In step S1503, it is determined whether the percentage of the number of individual correction values in the same direction in all the individual correction values in the same item among the individual correction values in the same item, set for the printing media, exceeds a predetermined percentage. The direction of correction is a positive direction when a correction value is positive or a negative direction when a correction value is negative. In the present embodiment, the predetermined percentage is set to 70%. When, of the types of printing media for which individual correction values are set, the number of the type of printing media of which the correction is in the same direction is higher than or equal to 70%, it is determined that there is a common tendency in correction, and the process proceeds to step S1504. When the correction in the same direction is less than 70%, it is determined that there is no common tendency in correction, and the process is ended.

In step S1504, common correction values are updated. Common correction values are set based on individual correction values of the types of printing media determined as corrections in the same direction, that is, the types of printing media included in 70% in step S1503. The smallest values of the set individual correction values are set as common correction values.

When common correction values are set in step S1504, the individual correction values are updated based on the set common correction values in step S1505. The individual correction values of printing media for which no individual correction values are set are not updated.

The process of FIG. 17 will be described by way of a specific example as follows.

FIG. 18A shows correction values when the process of step S1501 of FIG. 17 is executed. FIG. 18B shows correction values after the process of FIG. 17 is executed.

In step S1501, the correction values for the characteristic values of the printing medium set by a user are updated with learned values. The updated correction values are shown in FIG. 18A. Here, individual correction values for standard glossy paper, standard half-glossy paper, premium glossy paper, and thick glossy paper are set.

In step S1502, it is determined whether individual correction values of which the number is greater than or equal to the predetermined number are set. In the present embodiment, the predetermined number is set to four. As shown in FIG. 18A, the four individual correction values are set and are greater than or equal to the predetermined number, so the process proceeds to step S1503.

In step S1503, it is determined whether the percentage of the number of individual correction values in the same direction among the individual correction values set for the printing media exceeds a predetermined percentage. As for specular reflection value, the individual correction values for standard glossy paper, standard half-glossy paper, and premium glossy paper are correction values in the positive direction. Since three-quarters, that is, 75% of individual correction values are corrections in the same direction, the common correction value is updated in step S1504. Similarly, since 75% of individual correction values for diffused reflection value are corrections in the positive direction, the common correction value is updated. Since the percentage of the number of individual correction values that are corrections in the same direction is 50% for paper thickness, the common correction value is not updated.

In step S1504, the common correction values for the characteristic values on which the common correction values are updated are updated in step S1503. Of the individual correction values set for specular reflection value, the smallest value is set as a common correction value for specular reflection value. In the case of FIG. 18A, +4 is set as the common correction value for specular reflection value. Similarly, the common correction value for diffused reflection value is set to +2.

In step S1505, the individual correction values are updated based on the common correction values set in step S1504. Values obtained by adding the reference characteristic values of the types of printing media, the common correction values, and the individual correction values are corrected reference values. As for specular reflection value, the common correction value is set to +4, so the individual correction values are updated with values obtained by subtracting +4 from the set individual correction values, and the updated values are as shown in FIG. 18B. As for diffused reflection value as well, +2 is subtracted from the set individual correction values.

Thus, the process of FIG. 17 is ended.

Fifth Embodiment

In the above-described embodiment, even when reference characteristic values are updated, the sizes of set detection ranges remain unchanged. In the present embodiment, the sizes of the detection range are changed based on measured values and reference characteristic values.

Figure 19:
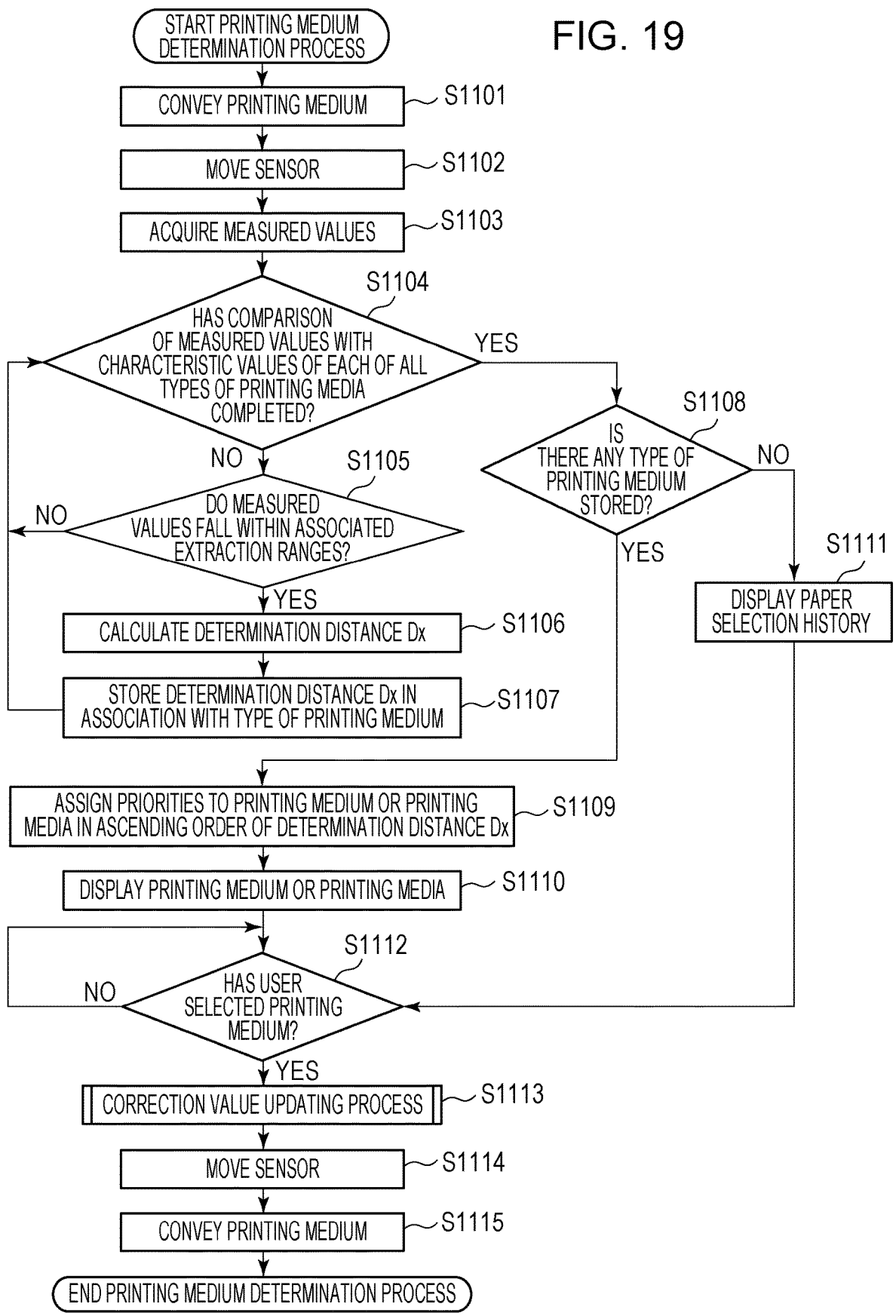
FIG. 19 is a flowchart showing a printing medium determination process in a fifth embodiment.

FIG. 19 is a flowchart showing a printing medium determination process of acquiring measurement results obtained by measuring the characteristics of the printing medium 105 to be printed, providing candidates for a printing medium to the input/output unit 406 based on the measurement results, and determining a type of the printing medium to be printed. In the following printing medium determination process, measured values are obtained as new information for characteristic values of a type of printing medium, selected by a user, and the predetermined characteristic values are changed based on the measured values so as to be brought close to the measured values. Through such learning, characteristic values with which a type of the printing medium can be more accurately selected are obtained.

The processes of step S1101 to step S1114 are implemented, for example, when the CPU 401 shown in FIG. 4 reads the program stored in the ROM 402 onto the RAM 403 and runs the program. The printing medium determination process may be executed by software on the host apparatus. In the present embodiment, since the input/output unit 406 is the operation panel provided in the printing apparatus 100, candidates for a printing medium are informed by displaying the names of printing media on the operation panel. The input/output unit 406 may be a combination of the host apparatus and the display connected to the host apparatus. When the input/output unit 406 is a speaker that has a microphone function and that is able to input or output voice, candidates for a printing medium are informed through the speaker, and a printing medium is selected by a user inputting the name of the printing medium or an associated reference sign by voice to the microphone.

As the CPU 401 receives an instruction to start sheet feed from a user through the operation panel that is the input/output unit 406, the CPU 401 starts the printing medium determination process of FIG. 19. FIG. 6A is an example of display on the operation panel to wait for input of an instruction to start the sheet feed process. The operation panel is a touch panel with which a user is able to make touch input. When "YES" is touched and sheet feed is started, the printing medium 105 is conveyed by the conveyor roller to a position where the optical sensor 201 is able to detect the printing medium 105 on the platen 106 (step S1101).

After the printing medium 105 is conveyed, the carriage 101 moves in the X direction and the optical sensor 201 moves to above the printing medium 105 in step S1102.

In step S1103, a specular reflection value V1, diffused reflection value V2, and printing medium thickness value (hereinafter, paper thickness) V3 of the printing medium 105 are acquired with the optical sensor 201. A diffused reflection value corresponds to the whiteness of a printing medium. A specular reflection value corresponds to the glossiness of a printing medium. The printing medium determination process may be executed by using the width of a printing medium in the X direction as one of the characteristics of the printing medium. A position where the characteristics of a printing medium are measured may be one, or an average of measurement results at multiple points may be used. Measurement of the characteristics may be performed in a state where the optical sensor 201 is stopped or may be performed while the optical sensor 201 is being moved. Measured values are once stored in a memory such as the RAM 403.

Subsequently, in the processes of step S1104 to step S1107, the CPU 401 reads the acquired measured values from the memory and compares the measured values with the predetermined characteristic values of various printing media, stored in the EEPROM 404. Thus, types of printing media of which a degree to which the characteristic values fall under the characteristics indicated by the measured values is higher than a predetermined degree are extracted. Details will be described below.

In step S1104, it is determined whether comparison with the characteristic values of all the types of printing media, stored in the EEPROM 404, has completed. When completion is determined, the process proceeds to step S1108.

When it is determined in step S1104 that the comparison has not completed, the process proceeds to step S1105, and the characteristic values of a type of printing medium are compared with the measured values. FIG. 20A shows the characteristic values of each of the types of printing media, stored in the EEPROM 404. The characteristic values are set to predetermined values and are unchanged values. Values obtained by converting an output voltage from analog to digital with 10 bits are stored as diffused reflection values and specular reflection values. The output voltage is a voltage that the optical sensor 201 outputs upon receiving light. FIG. 20B shows correction values and learning values stored in the EEPROM 404. Learning values will be described later. Correction values are values to be updated through learning. Values obtained by correcting the initial values of the predetermined characteristic values shown in FIG. 20A with the correction values shown in FIG. 20B are set as reference characteristic values (hereinafter, the reference values of the characteristic values), these values are compared with measured values, and the type of printing medium is identified. In the present embodiment, values obtained by multiplying the predetermined characteristic values by the correction values are set as reference characteristic values. For example, the reference value of the specular reflection value of plain paper A is expressed by Initial value (V1L_a) of specular reflection value×Correction value ($\alpha$_a). The type of a printing medium is detected with an extraction range set to a first range from a positive extraction limit value to a negative extraction limit value, shown in FIG. 20C, with reference to the reference value of the characteristic value. For example, the positive extraction limit value of the specular reflection value of plain paper A is J1_a and the negative extraction limit value of the specular reflection value of plain paper A is J1'_a, so the extraction range of the specular reflection value of plain paper A is from (V1L_a)×($\alpha$_a)−(J1'_a) to (V1L_a)×($\alpha$_a)+(J1'_a). In step S1105, it is determined whether the measured values measured in step S1103 falls within the extraction ranges of a printing medium of a predetermined type. When the measured values do not fall within the extraction ranges, the process returns to step S1104, and determination is performed on the next type of printing medium. When the measured values fall within the extraction ranges, the process proceeds to step S1106.

In step S1106, a determination distance Dx that indicates a closeness between the measured values and the reference values of the characteristic values is calculated. The determination distance Dx indicates that a type of printing medium having reference values of characteristic values of which the determination distance Dx is shorter is closer to the measured type of printing medium. Hereinafter, a formula for calculating the determination distance Dx is shown by using plain paper A as an example.

$$Dx = \{V1-(\alpha\_a) \times (V1L\_a)\}^2 + \{V2-(\beta\_a) \times (V2L\_a)\}^2 + \{V3-(\gamma\_a) \times (V3L\_a)\}^2$$

A method of finding a determination distance Dx is not limited to the above-described formula and may be any method in which a similarity between measured values and reference values of characteristic values can be calculated. In the present embodiment, a distance between all measured values to be acquired and reference values of characteristic values are collectively found; however, when a correlation therebetween is low, distances from individual characteristic values may be found separately and then closeness to the measured values may be determined.

In step S1107, the determination distance Dx calculated in step S1106 and the type of a printing medium are temporarily stored in the RAM 403 in association with each other.

When the processes of step S1104 to step S1107 are executed over all the types of printing media, affirmative determination is made in step S1104, and the process proceeds to step S1108. In step S1108, it is determined whether there is any type of printing medium stored in the RAM 403. When there is no type of printing medium stored in the RAM 403, all the categories are displayed on the operation panel as shown in FIG. 6B (step S111). The categories are arranged in a predetermined order and displayed. In the case where the categories are displayed, when a category selected by a user is input, the types of printing media in the category are displayed as shown in FIG. 6C. Then, of the types of printing media displayed, the input of the selected type of printing medium is received. The input is made by touching the name of the printing medium displayed. FIG. 6B shows "ALL" at the bottom in addition to the categories of printing media. When "ALL" is selected, all the printing media are displayed in a predetermined order. Recording media may be displayed in recent order, that is, in order from the latest used printing medium.

When there is a type of printing medium stored in the RAM 403 in step S1108, the stored type of printing medium is assigned with a priority in ascending order of determination distance Dx (step S1109).

As shown in FIG. 6D, the names of the types of printing media are displayed from the top in descending order of priority determined in step S1109 (step S1110).

When an icon 40 displayed on the operation panel in FIG. 6D is touched, display of the screen can be scrolled downward. When "STOP" is touched, the printing medium determination process is cancelled, and display of FIG. 6A is switched to display of a home screen. FIG. 6D shows the names of printing media in descending order of priority with codes 1 to 3 prefixed to the names of printing media. Selection of a type of printing medium is made by touching any one of the names of printing media displayed. Here, the priority of standard half-glossy paper to which number 1 is assigned is the highest. Codes may be any codes as long as the codes can indicate the level of priority, and may be codes other than numerals. A display method is not limited thereto and may be any method as long as a user can recognize the order of priority.

In FIG. 6D, candidates for a printing medium can be displayed up to three from the top; however, since the number of the extracted types of printing media is two, only two printing media are displayed in FIG. 6D. A user is informed that there is no third candidate by displaying "NO AVAILABLE CHOICE" in the third field in light color (or dark color) so as to be less attractive than the names of the above-described two printing media. For example, when the background color of the operation panel is black, two printing media are displayed in white color and the text "NO AVAILABLE CHOICE" is displayed in gray color lower in brightness than white color. Categories of paper are displayed below the text "NO AVAILABLE CHOICE". In this way, when a printing medium that a user desires is not included in printing media displayed on the input/output unit 406, an individual printing medium is allowed to be selected in order to select a printing medium of another type. In the present embodiment, the category to which a type of printing medium in the first place belongs is displayed at the top. By displaying categories having close characteristics at higher levels to make it easy to select those categories, even when a printing medium that a user desires is not included in candidates for a printing medium, time and effort that take until the category of a desired printing medium is selected can be reduced.

FIG. 8A to FIG. 8C show methods of displaying candidates for a type of printing medium on the input/output unit 406 in other modes. As shown in FIG. 8A, when not all the candidates for a type of printing medium can be displayed on the operation panel, the input/output unit 406 may be configured such that a lower-level candidate can be displayed through scroll operation, or the like. Alternatively, candidates do not need to be displayed in order from higher level as long as a user can recognize the order of priority. The name of the highest-level printing medium may be displayed at the center of the operation panel. Alternatively, as shown in FIG. 8B, the level of priority may be indicated by increasing the size of characters representing the name of a printing medium having a higher level of priority or displaying the characters in boldface. Categories are displayed below the text "PAPER CATEGORY"; however, categories may be displayed without any text meaning "PAPER CATEGORY". Alternatively, not categories but types of printing media other than candidates for a printing medium may be displayed below the candidates.

Alternatively, as shown in FIG. 8C, only a printing medium having a priority in the first place may be displayed. When a user desires to select another one of extracted printing media, the user can select a portion of the item of the printing medium displayed as standard plain paper in FIG. 8C. A display method may be configured such that, when the selection is input, the screen appears as shown in FIG. 6D and another printing medium can be selected.

When a user selects a type of printing medium on the input/output unit 406 in step S1112, the correction values are updated with learned values in step S1113. A process of updating correction values will be described later.

Subsequently, the carriage 101 is moved to a stand-by position in step S1114. Then, in step S1115, the printing medium 105 is conveyed to the stand-by position for printing with the printing head 102 by the conveyor roller.

Thus, the printing medium determination process ends. When a printing job is received from the user, printing is started. When the type of printing medium selected and input by a user from the input/output unit 406 is different from the type of printing medium in a job sent from a host computer to the printing apparatus 100, the CPU 401 may be configured not to update the correction values of the printing medium, stored in the EEPROM 404.

Correction Value Updating Process

Figure 21:
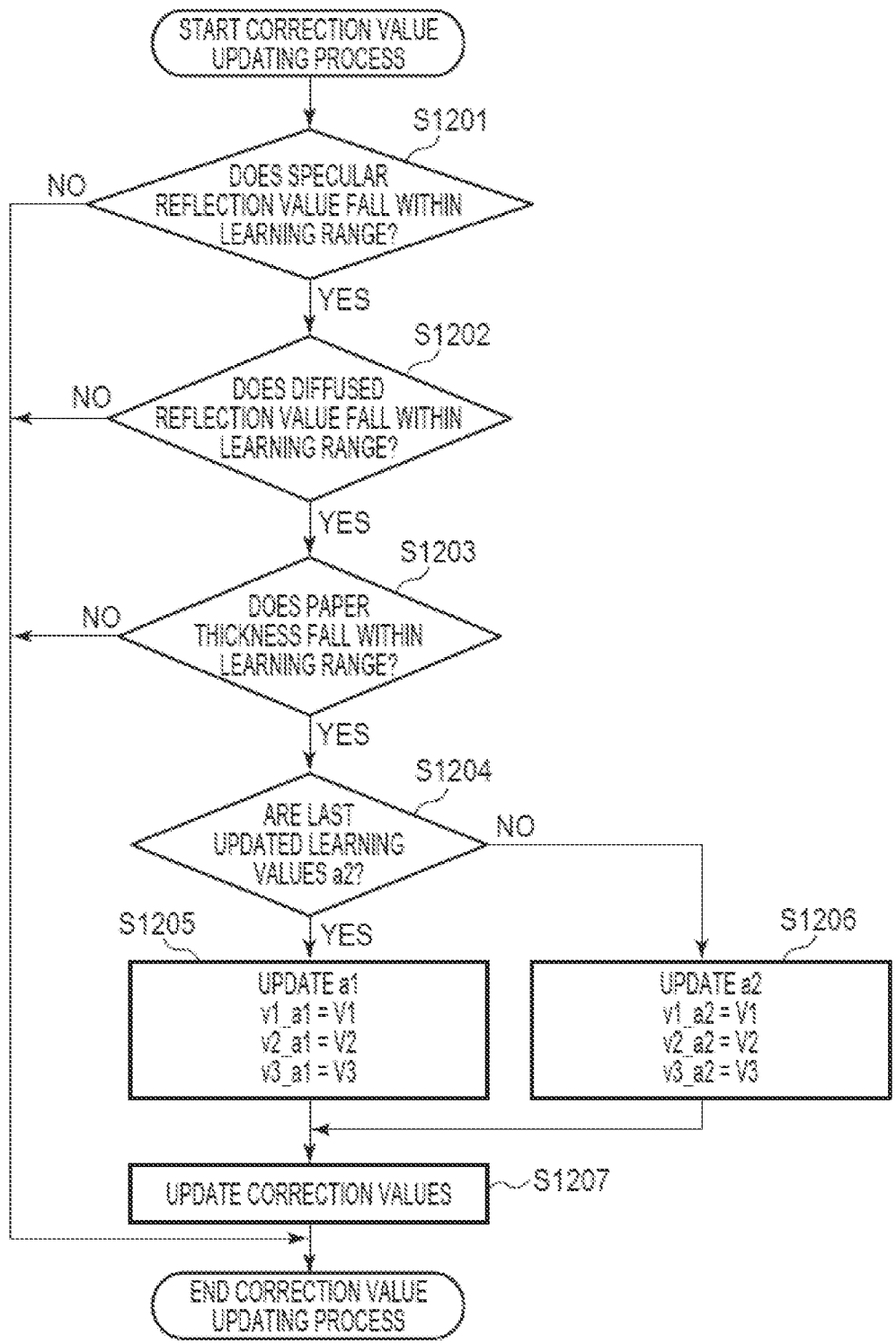
FIG. 21 is a flowchart showing a correction value updating process in the fifth embodiment.

FIG. 21 is a flowchart showing the correction value updating process for a printing medium in step S1113 of FIG. 19. Description will be made by way of an example in which a user selects plain paper A in step S1112 of FIG. 19.

It is determined whether the measured values fall within the learning ranges that are a second range of the selected printing medium (here, plain paper A). The learning ranges will be described here. If learning is performed based on a measured value significantly different from a reference value of a characteristic value, a wrong value may be learned, so a learning range that is the range of a measured value to be learned is set. The learning range is a range larger by a predetermined distance from the extraction range in the present embodiment. The ranges from the positive learning limit values to the negative learning limit values, shown in FIG. 20C, are set as learning ranges with reference to the reference values of the characteristic values, and the learning limit values are stored in the EEPROM 404. The predetermined distance between the extraction ranges and the learning ranges may be varied among the types of printing media. When the measured values fall within the learning ranges of the selected printing medium, the correction values are changed. A predetermined number of measured values are stored in the EEPROM 404 as learning values of plain paper A, and the correction values each are updated based on the learning values. In the present embodiment, a mode in which two learning values are stored will be described.

In step S1201, it is determined whether the measured specular reflection value V1 falls within the learning range of specular reflection value of plain paper A. The learning range of specular reflection value of plain paper A is from $(V1L\_a) \times (\alpha\_a) - (L1'\_a)$ to $(V1L\_a) \times (\alpha\_a) + (L1\_a)$. When the measured value does not fall within the learning range, the correction value is not updated, so the correction value updating process is ended. When the measured value falls within the learning range, the process proceeds to step S1202.

In step S1202, it is determined whether the measured diffused reflection value V2 falls within the learning range of diffused reflection value of plain paper A. The learning range of diffused reflection value of plain paper A is from $(V2L\_a) \times (\beta\_a) - (L2'\_a)$ to $(V2L\_a) \times (\beta\_a) + (L2\_a)$. When the measured value does not fall within the learning range, the correction value is not updated, so the correction value updating process is ended. When the measured value falls within the learning range, the process proceeds to step S1203.

In step S1203, it is determined whether the measured paper thickness V3 falls within the learning range of paper thickness of plain paper A. The learning range of paper thickness of plain paper A is from $(V3L\_a) \times (\gamma\_a) - (L3'\_a)$ to $(V3L\_a) \times (\gamma\_a) + (L3'\_a)$. When the measured value does not fall within the learning range, the correction value is not updated, so the correction value updating process is ended. When the measured value falls within the learning range, all the characteristics fall within the learning ranges, so the measured values are stored in the EEPROM 404 as learning values, and the process proceeds to step S1204.

In step S1204, in order to update the learning values stored in the EEPROM 404, it is determined whether last updated learning values are stored in a storage position a2. When the storage position is a2 (YES in step S1204), the learning values stored in a1 are updated with the measured values in step S1205. When the storage position is a1 (NO in step S1204), the learning values stored in a2 are updated with the measured values in step S1206. The learning values stored in the EEPROM 404 are selected when a printing medium to be printed is plain paper A and are last and second-last two learning values for which the measured values fall within the learning ranges. The second-last learning values that are the oldest learning values are overwritten and updated with currently measured values in step S1204 to step S1206.

In step S1207, average values of the learning values stored in the EEPROM 404 are obtained, percentages by which the average values are distant from the reference values of the characteristic values are calculated, the correction values are updated with the percentages. Thus, the correction value updating process is ended.

Extraction Range Changing Process

Figure 22:
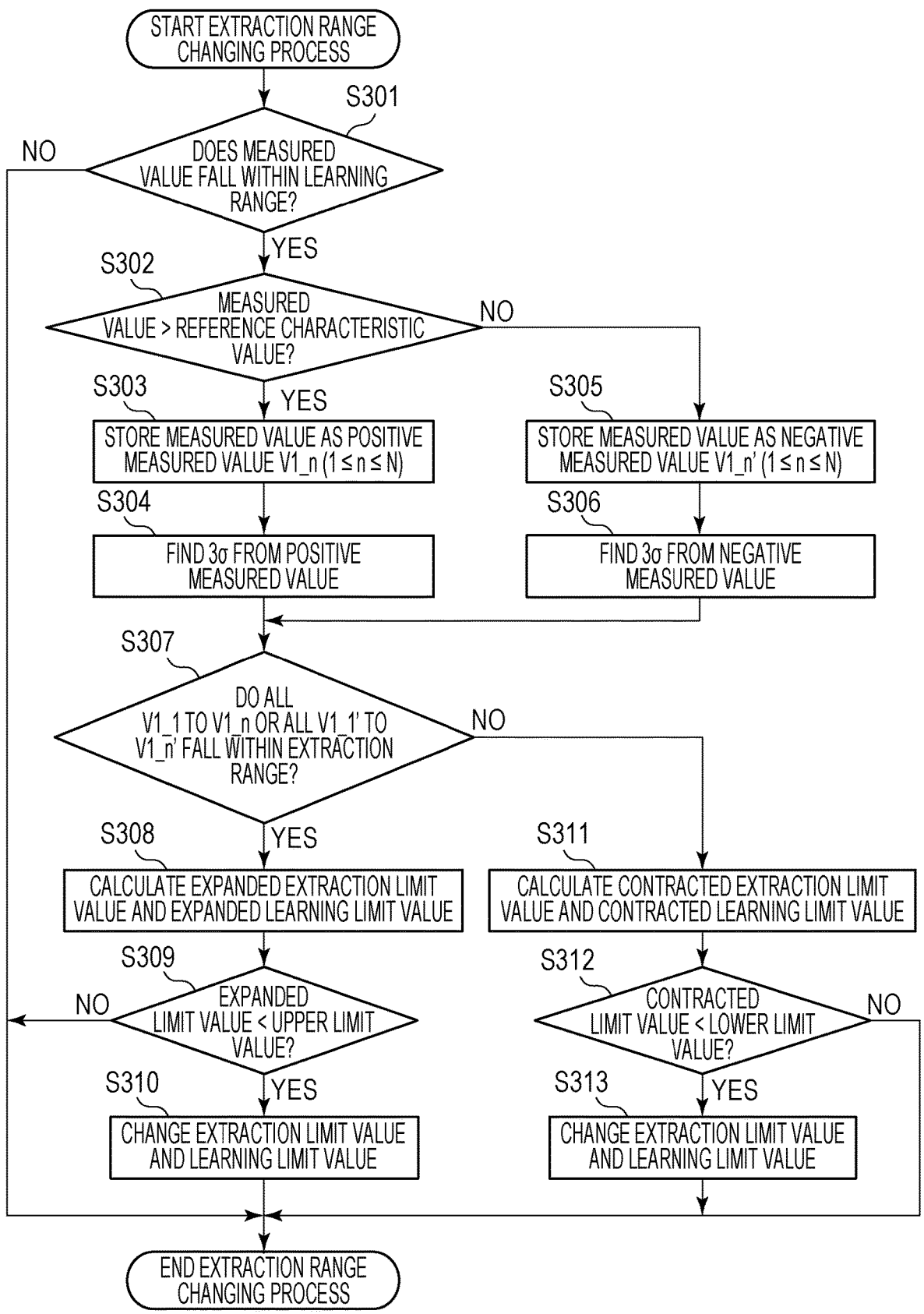
FIG. 22 is a flowchart showing an extraction range changing process in the fifth embodiment.

FIG. 22 shows a flowchart of an extraction range changing process. The extraction range changing process is executed after the correction value updating process of FIG. 21 is ended. This process is to expand or contract the extraction ranges according to measured values. The extraction range is changed for each of the characteristics of a printing medium. Here, description will be made on specular reflection value at the time when a user selects plain paper A. When a measured value does not fall within the extraction range but falls within the learning range, the measured value is caused to fall within the extraction range through the following process. When a measured value falls within the extraction range and the extraction range is relatively wide as compared to the measured value, the extraction range is contracted.

First, in step S301, it is determined whether the measured value V1 of specular reflection, acquired in step S1103 of FIG. 19, is a value that falls within the learning range. This can be expressed by the following inequality.

$$(V1L\_a) \times (\alpha\_a) - (L1'\_a) \leq V1 \leq (V1L\_a) \times (\alpha\_a) + (L1\_a)$$

When the measured value V1 falls outside the learning range, the measured value V1 is not a value to be learned, so the process ends. When the measured value V1 falls within the learning range, it is determined in step S302 whether the measured value V1 is greater than the reference value of the characteristic value $(V1L\_a) \times (\alpha\_a)$. Thus, it is determined whether the measured value V1 is a positive-side value or a negative-side value with respect to the reference characteristic value.

When the measured value V1 is greater than the reference value of the characteristic value $(V1L\_a) \times (\alpha\_a)$ (YES in step S302), the measured value V1 is a positive-side value with respect to the reference value of the characteristic value $(V1L\_a) \times (\alpha\_a)$, and the measured value is stored in the EEPROM 404 as V1_n in step S303. A newer measured value is stored in a smaller n. n=N is the largest number, and the oldest measured value is stored in n=N. When the number of measured values stored in the EEPROM 404 exceeds the maximum value N, the older measured value is discarded, and a new value is saved in that place. Here, N=2. In S304, a standard deviation 3σ1 is found from an average V1ave and variance V1var of the N measured values V1 of positive specular reflection. The standard deviation 3σ1 is used when the extraction range is expanded in step S308 or contracted in step S311. A formula for finding the standard deviation 3σ1 is shown below. In the formula, a measured value V1_n of specular reflection is denoted by V1n.

$$V1_{ave} = \frac{\sum_{n=1}^{N} V1_n}{N}$$

$$V1_{var} = \frac{\{(V1_{ave} - V1_1)^2 + (V1_{ave} - V1_2)^2 + \ldots + (V1_{ave} - V1_N)^2\}}{N}$$

$$\sigma 1 = \sqrt{V1_{var}}$$

$$3\sigma 1 = 3 \times \sigma 1$$

When the measured value V1 is less than or equal to the reference value of the characteristic value $(V1L\_a) \times (\alpha\_a)$ (NO in step S302), the measured value V1 is a positive-side value with respect to the reference value of the characteristic value $(V1L\_a) \times (\alpha\_a)$, and the measured value is stored in the EEPROM 404 as V1_n' in step S305. In S306, a standard deviation 3σ1 is found from an average V1ave and variance V1var of the N measured values V1_n' of negative specular reflection.

When the process of step S304 or step S306 ends, it is determined in step S307 whether the measured value falls within the extraction range. When the process proceeds to step S303, it is determined whether V1_1 to V1_N fall within the extraction range. When the process proceeds to step S305, it is determined whether V1_1' to V1_N' fall within the extraction range.

When any one of the measured values stored in the EEPROM 404 does not fall within the extraction range, the extraction range is expanded in step S308 such that all the measured values fall within the extraction range. The learning range is also expanded to a range wider in predetermined distance than the extraction range. To expand the extraction range and the learning range, 3σ1 calculated in step S304 or step S306 is used. Formulae for changing extraction limit values and learning limit values to expand the extraction range and the learning range are shown below.

$$J1\_a = (V1ave + 3\sigma 1)$$

$$J1'\_a = (V1ave - 3\sigma 1)$$

$$J1\_a = (L1\_a + (V1ave + 3\sigma 1 - J1\_a))$$

$$J1'\_a = (L1\_a + (V1ave - 3\sigma 1 - J1\_a))$$

Subsequently, in step S309, it is determined whether the expanded extraction limit value calculated in step S308 is a value greater than an upper limit value J1max. In the present embodiment, the range of values that the extraction limit values J1_a, J1'_a can take on is determined. The size of the range that the learning limit values can take on is the same as that of the extraction limit values. When the expanded extraction limit value J1_a is a value greater than the upper limit value J1max, the extraction range changing process is ended without expanding the extraction range. When the expanded extraction limit value J1_a is not a value greater than the upper limit value J1max, the extraction limit value and the learning limit value are updated with the expanded extraction limit value and expanded learning limit value calculated in step S308 as a new extraction limit value and a new learning limit value, and the extraction range changing process is ended. When any one of the expanded extraction limit value is greater than the upper limit value in step S309, the extraction limit value is not updated; however, the extraction limit value may be updated with the upper limit value as the extraction limit value. The range that the extraction range can take on and the range that the learning range can take on may be individually provided.

When all the measured values stored in the EEPROM 404 fall within the extraction range in step S307, the extraction range is contracted in step S311 to such a range that all the measured values fall within the extraction range. The learning range is also contracted to such a range that is wider in predetermined distance than the extraction range. Similar formulae to those used in step S308 are used to calculate extraction limit values and learning limit values.

Subsequently, in step S312, it is determined whether the contracted extraction limit value calculated in step S311 is a value less than a lower limit value J1min. When the contracted extraction limit value J1_a is less than the lower limit value Jmin, the extraction range changing process is ended without contracting the extraction range. When the contracted extraction limit value J1_a is not a value less than the lower limit value J1min, the extraction limit value and the learning limit value are updated with the contracted extraction limit value and contracted learning limit value calculated in step S311 as a new extraction limit value and a new learning limit value, and the extraction range changing process is ended.

The above-described extraction range changing process is similarly executed on diffused reflection value and paper thickness.

In the present embodiment, the standard deviation $3\sigma$ is used to expand or contract the ranges. When the standard deviation $3\sigma$ is used, a range in which 99.7% of all the measured values stored in the EEPROM 404 fall can be calculated. A value other than $3\sigma$ may be used as a standard deviation according to the percentage of measured values intended to be included in the range among all the measured values stored in the EEPROM 404.

Sixth Embodiment

In the present embodiment, a method of determining extraction limit values and learning limit values for a printing medium of which characteristic values are not prestored in the EEPROM 404 will be described.

In the present embodiment, when a user desires to use a printing medium of which characteristic values are not prestored in the EEPROM 404, characteristic values, extraction limit values, and learning limit values are set for the intended type of printing medium. Thus, the print medium can be extracted as a candidate for a printing medium in the printing medium determination process of FIG. 19.

As for the characteristic values of an intended printing medium, first, a user selects the closest type of printing medium of the prestored printing media. The characteristic values set for the selected type of printing medium are set for the characteristic values of the intended printing medium.

As for the extraction range and learning range of the intended printing medium, such extraction limit values and learning limit values that the extraction range and the learning range have the same size as the extraction range and learning range of the type of printing medium having the widest extraction range of the prestored printing media are set.

The characteristic values may be acquired by measuring an intended printing medium with the optical sensor 201.

Seventh Embodiment

In the first embodiment and the second embodiment, characteristic values are changed based on measured values. However, it is conceivable that characteristic values are not changed so as to increase the accuracy of extracting a type of printing medium. For example, it is presumable that a user may erroneously select a type of printing medium different from a desired printing medium. In such a case, the characteristic values of an erroneously selected printing medium are changed based on measured values, so a type of printing medium may not be accurately extracted with the changed characteristic values.

In the above-described situation, it is also presumable that the changed characteristic values may be reset. The present embodiment describes a mode in which changed characteristic values are reset. When the printing apparatus 100 is used by a plurality of users, characteristic values may be reset retroactively to changes of characteristic values resulting from the usage of a former user. A mode in which characteristic values can be reset to initial values will be described as an example. Initial values here are characteristic values of printing media prestored in the EEPROM 404 when the printing apparatus 100 is used by a user for the first time.

Description will be made on the assumption that a printing apparatus of the present embodiment is the printing apparatus described in the second embodiment, which displays a candidate for a printing medium based on history information. The description of portions similar to those of the above-described embodiments is omitted. In the printing medium determination process, when a user erroneously selects a type of printing medium, a recommendation for resetting data of learned characteristic values may be informed. A user is prompted to reset through notification, and informing an incorrectly extracted candidate can be prevented.

Figure 23:
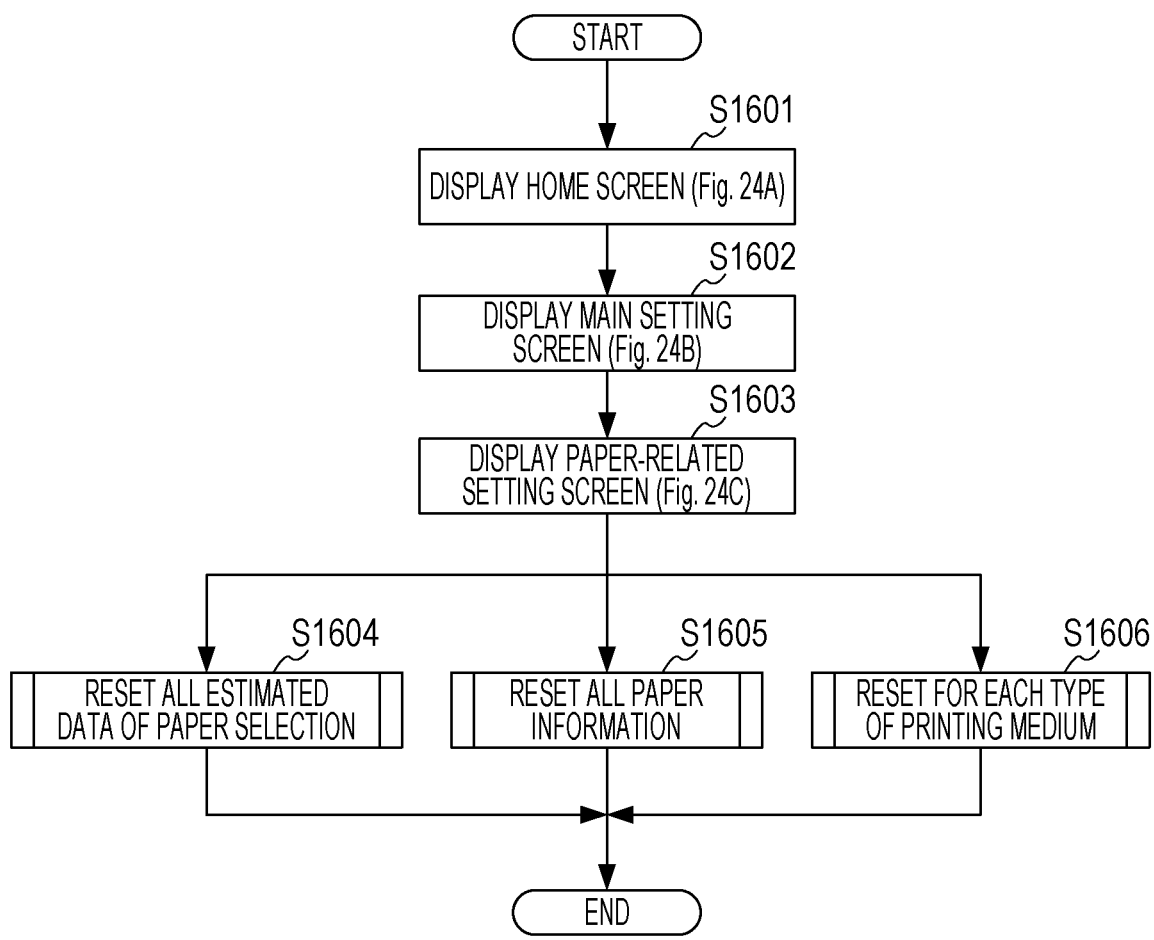
FIG. 23 is a flowchart showing a resetting process in a sixth embodiment.

FIG. 23 shows a flowchart of a resetting process. The resetting process is a process that the CPU 401 executes in accordance with a program stored in the ROM 402.

Both characteristic values of types of printing media, prestored as initial values, as shown in FIG. 7A, and learned characteristic values of types of printing media, changed through learning, as shown in FIG. 7B, are stored in the EEPROM 404. Characteristic values to be changed through learning are shown in FIG. 7B. In the printing medium determination process of FIG. 13, the learned characteristic values shown in FIG. 7B are compared with the measured values measured with the optical sensor 201, and a candidate for a type of printing medium is extracted. Characteristic values stored as initial values are not changed. The process of resetting learned characteristic values to initial values are executed by storing the initial values of the characteristic values, stored in the EEPROM 404, in areas where the learned characteristic values are stored.

In the present embodiment, an "estimated data resetting" process of resetting learned characteristic values that are data for estimating a type of printing medium to initial values and a "paper information resetting" process of resetting all information set on types of printing media to be reset can be executed. Hereinafter, data of learned characteristic values are also referred to as estimated data. The paper information resetting process is a process of resetting information associated with all the printing media to an initial state, and includes a process of clearing information stored as history information by resetting the history information in addition to a process of resetting learned characteristic values to initial values. Alternatively, as in the case of the third embodiment, a mode in which characteristic values and correction values of printing media are provided is also applicable. In this case, estimated data is reset by resetting correction values to initial values.

First, in step S1601, a home screen (FIG. 24A) is displayed on the input/output unit 406. FIG. 24A shows a state when "MAIN SETTINGS" is selected from among the items displayed on the home screen. When an item is selected, the selected item is highlighted, and the next screen is displayed. In FIG. 24A to FIG. 24H, the item is highlighted such that the background of the item is varied in color from the other items and the frame of the item is widened.

Figure 24B:
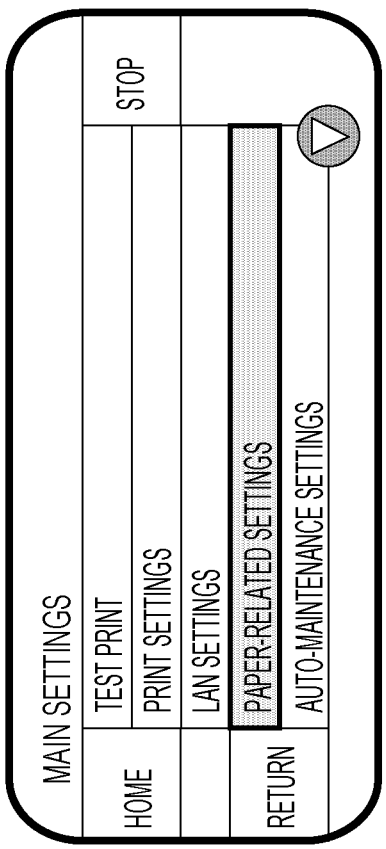
FIG. 24A to FIG. 24H are views showing display modes of an input/output unit in the sixth embodiment.

When "MAIN SETTINGS" is selected on the home screen, a main settings screen as shown in FIG. 24B is displayed on the input/output unit 406 in step S1602. When "PAPER-RELATED SETTINGS" is selected on the main settings screen, "PAPER-RELATED SETTINGS" is highlighted as shown in FIG. 24B, and a paper-related settings screen as shown in FIG. 24C is displayed in step S1603. FIG. 24C shows a state when "DETAILED PAPER SETTINGS" is selected on the settings screen. On the paper-related settings screen, items for setting printing medium information in the printing apparatus 100 are displayed. The items include, for example, an item for setting the level of the printing head 102 at the time of printing and an item for setting a cut speed at the time of cutting rolled paper.

When a user desires to reset learned characteristic values for all the types of printing media, the user selects "RESET ALL ESTIMATED DATA OF PAPER SELECTION" on the paper-related settings screen. When "RESET ALL ESTIMATED DATA OF PAPER SELECTION" is selected, the learned characteristic values of all the types of printing media are reset to the initial values shown in FIG. 7A, stored in the EEPROM 404, in step S1604. A process of resetting all the estimated data will be described in detail later.

When a user desires to reset all the printing medium information about printing media, the user selects "RESET ALL PAPER INFORMATION". When "RESET ALL PAPER INFORMATION" is selected, initilizable data including characteristic values and history information are reset to the initial values in step S1605. A process of resetting all the printing medium information will be described in detail with reference to FIG. 26.

When a user desires to reset learned values or history information of characteristic values for each type of printing medium, "DETAILED PAPER SETTINGS" is selected. When "DETAILED PAPER SETTINGS" is selected, characteristic values and history information for each type of printing medium is reset in step S1606. This will be described in detail later with reference to FIG. 27.

Thus, the resetting process is ended.

Figure 25:
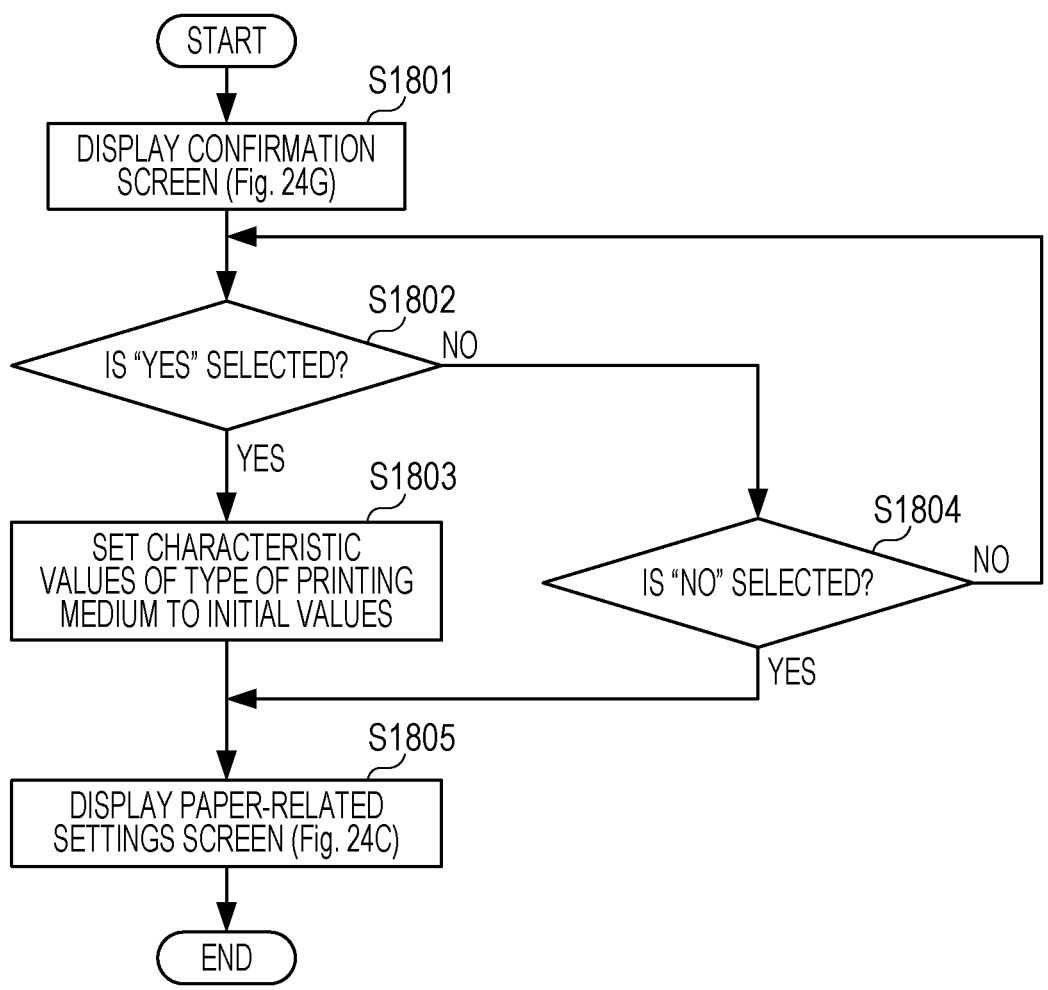
FIG. 25 is a flowchart showing a process of resetting estimated data in the sixth embodiment.

The process of resetting all the estimated data of paper selection in step S1604 of FIG. 23 will be described. FIG. 25 is a flowchart showing the process of step S1604.

Figure 24D:
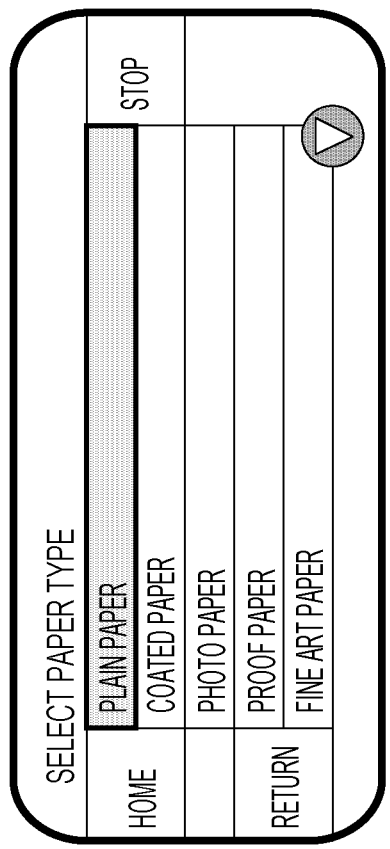
Figure 24A:
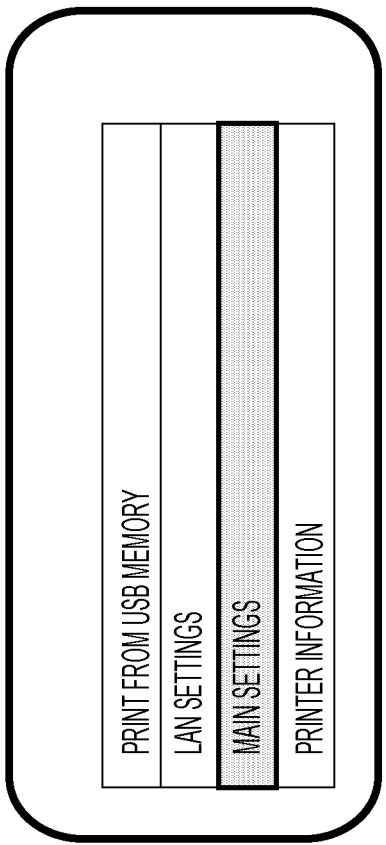
Figure 24C:
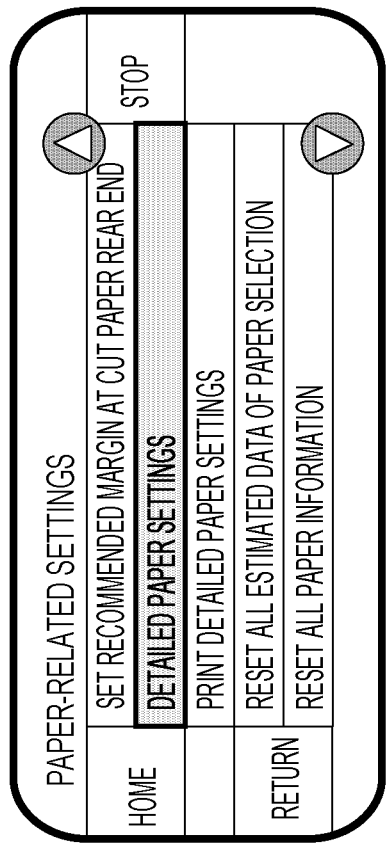
Figure 24F:
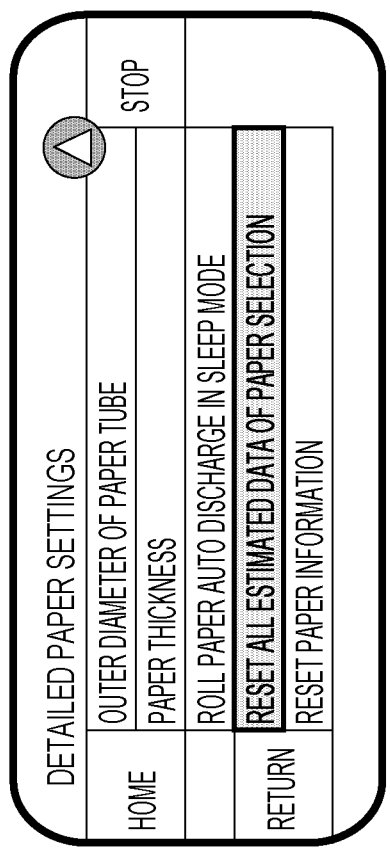
Figure 24H:
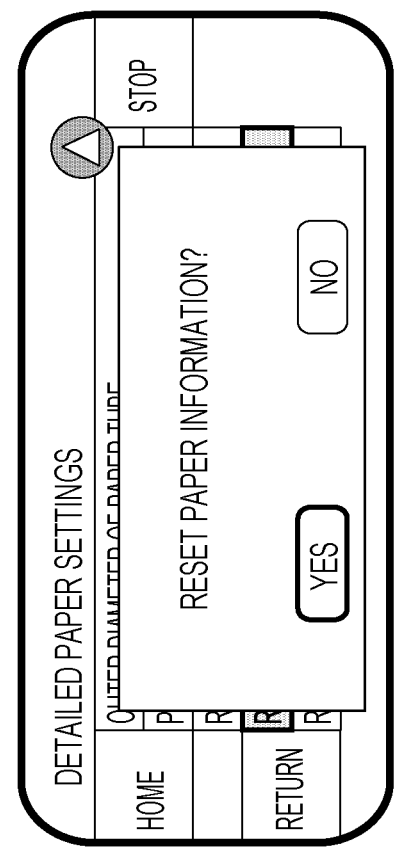
Figure 24E:
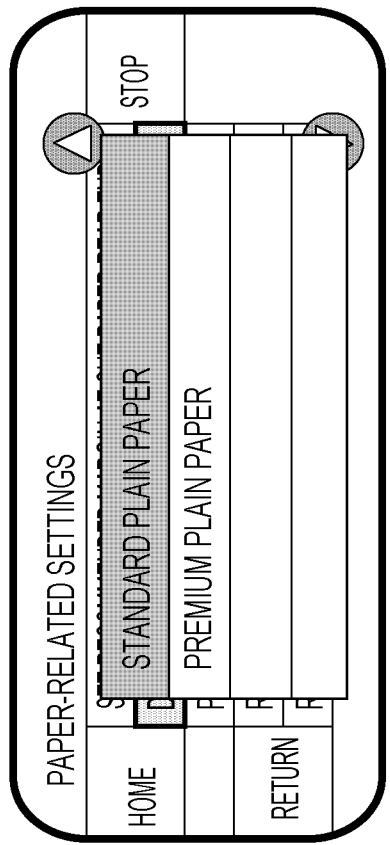
Figure 24G:
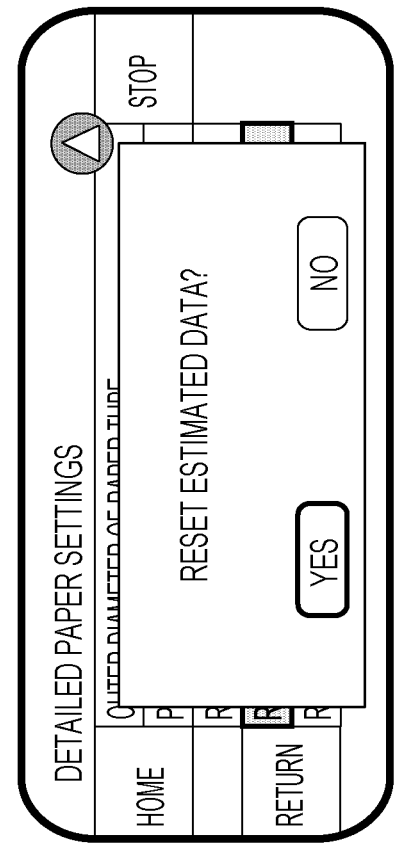

When "RESET ALL ESTIMATED DATA OF PAPER SELECTION" is selected on the paper-related settings screen (FIG. 24C), a confirmation screen as shown in FIG. 24G is displayed in step S1801. When "YES" is selected on the conformation screen (Yes in step S1802), the learned characteristic values of all the printing media are reset to the initial values in step S1803. Subsequently, the paper-related settings screen is displayed on the input/output unit 406 in step S1805, and the process is ended.

When "YES" is not selected (No in step S1802) and "NO" is selected (Yes in step S1802) on the confirmation screen, the paper-related settings screen is displayed on the input/output unit 406 in step S1805, and the process is ended. When "YES" is not selected (No in step S1802) and "NO" is not selected (No in step S1804) on the confirmation screen, the confirmation screen is displayed until one of both is selected.

The process of resetting all the estimated data of paper selection is executed as described above.

Figure 26:
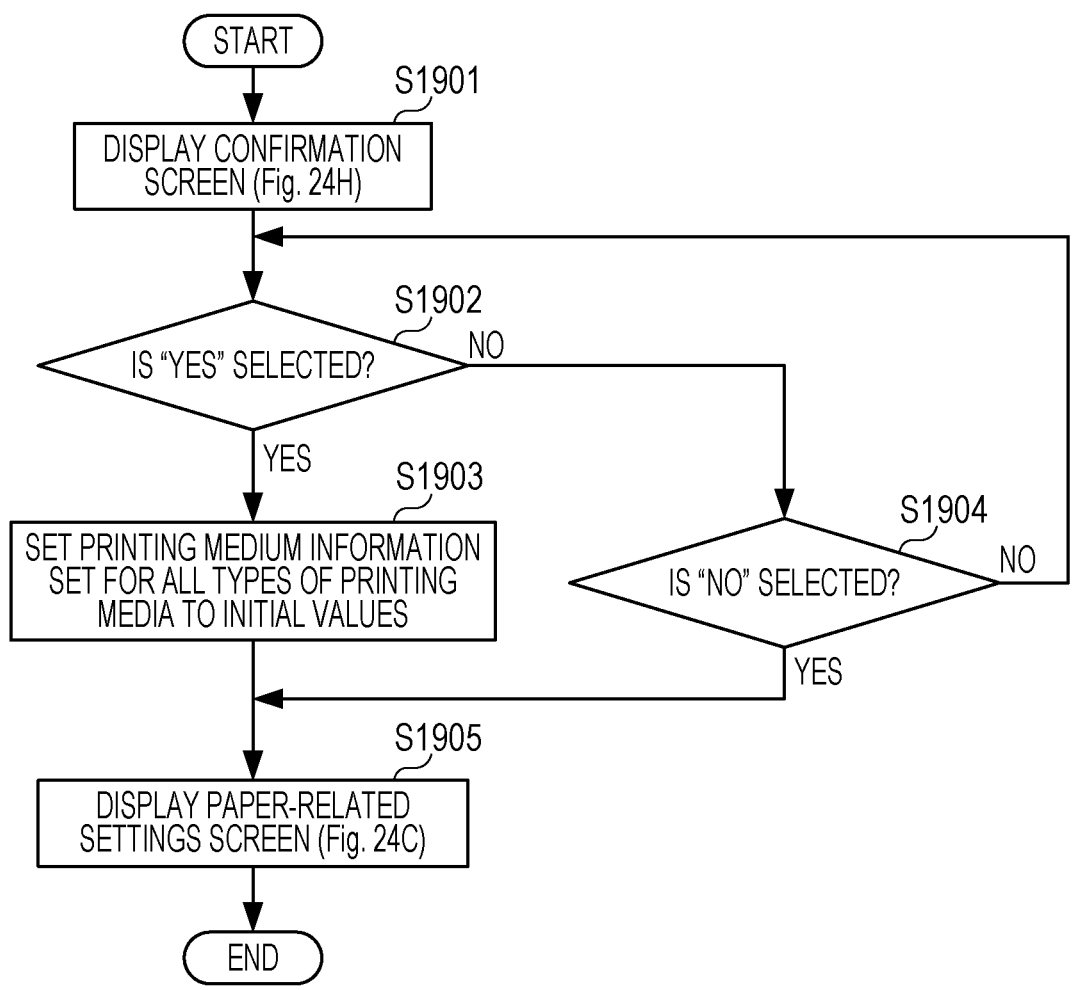
FIG. 26 is a flowchart showing a process of resetting printing medium information in the sixth embodiment.

Next, the process of resetting all the printing medium information in step S1605 of FIG. 23 will be described. FIG. 26 is a flowchart showing the process of step S1605.

When RESET ALL PAPER INFORMATION" is selected on the paper-related settings screen (FIG. 24C), a confirmation screen as shown in FIG. 24H is displayed in step S1901. When "YES" is selected on the conformation screen (Yes in step S1902), the printing medium information set for all the types of printing media is set to the initial values in step S1903. The printing medium information contains not only characteristic values and history information of types of printing media but also, for example, the setting of the level of the printing head 102 at the time of printing, a cut speed at the time of cutting rolled paper, and the like. Subsequently, the paper-related settings screen is displayed on the input/output unit 406 in step S1905, and the process is ended.

When "YES" is not selected (No in step S1902) and "NO" is selected (Yes in step S1904) on the confirmation screen, the paper-related settings screen is displayed on the input/output unit 406 in step S1905, and the process is ended. When "YES" is not selected (No in step S1902) and "NO" is not selected (No in step S1904) on the confirmation screen, the confirmation screen is displayed until one of both is selected.

The process of resetting all the printing medium information of paper selection is executed as described above.

Figure 27:
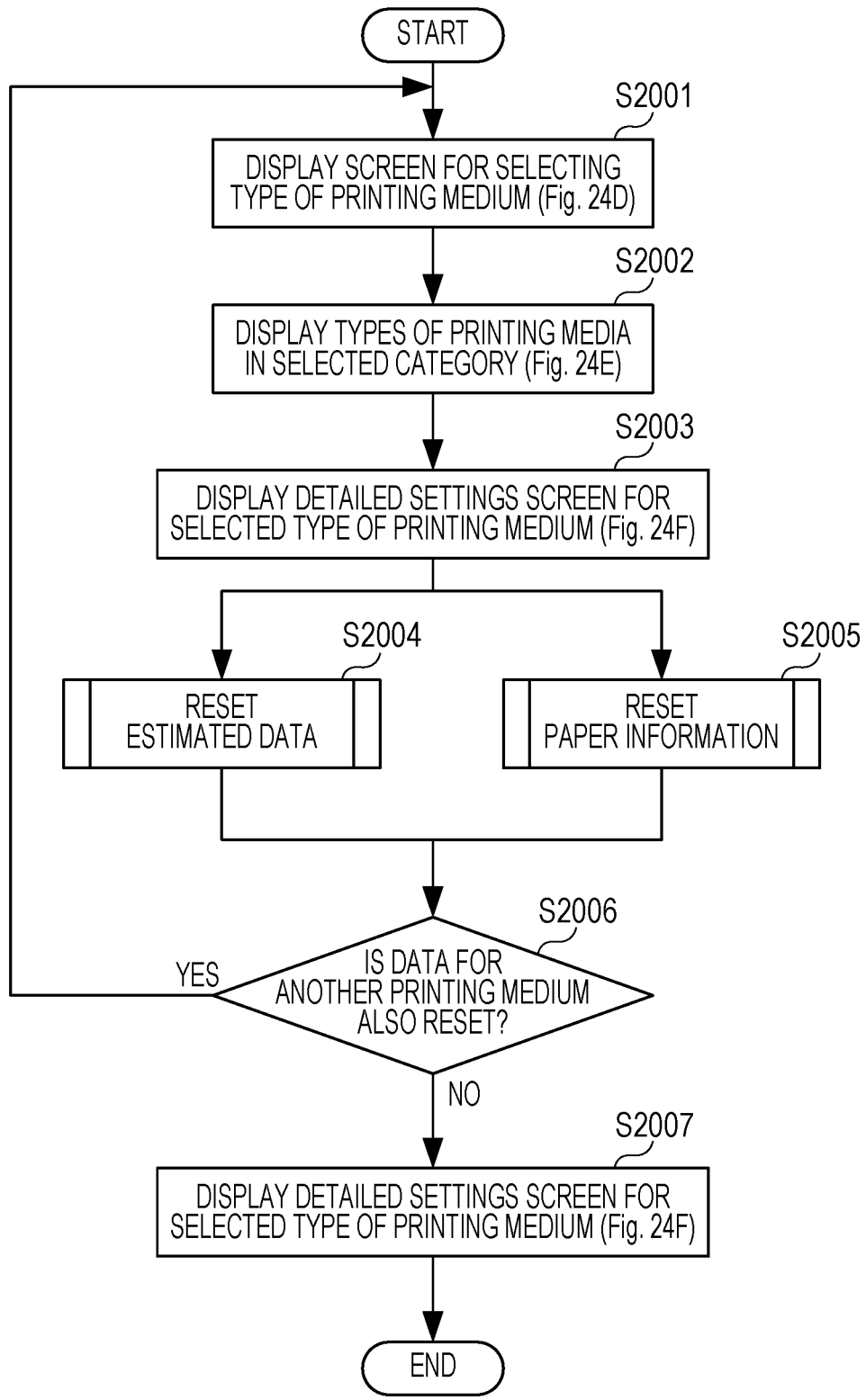
FIG. 27 is a flowchart showing a process of resetting for each of types of printing media in the sixth embodiment.

Next, the resetting process for each type of printing medium in step S1606 of FIG. 23 will be described. FIG. 27 is a flowchart showing the process of step S1606.

When "DETAILED PAPER SETTINGS" is selected on the paper-related settings screen (FIG. 24C), a screen for selecting a type of printing medium as shown in FIG. 24D is displayed in step S2001. In FIG. 24D, a category of a printing medium can be selected. FIG. 24D shows a state where the category of plain paper is selected. For example, when the category of plain paper is selected, "STANDARD PLAIN PAPER" AND "PREMIUM PLAIN PAPER" that are types of printing media that belong to the category of plain paper are displayed in step S2002 (FIG. 24E). FIG. 24E shows a state when standard plain paper is selected.

When a type of printing medium is selected in step S2002, a detailed settings screen for the selected type of printing medium is displayed as shown in FIG. 24F in step S2003. FIG. 24F shows a state when "RESET ESTIMATED DATA OF PAPER SELECTION" is selected. The outer diameter of paper tube, the thickness of paper, and the like, can be set for each type of printing medium from the screen of FIG. 24F. Learned values of characteristic values of a type of printing medium can be reset or printing medium information can be reset from this screen.

When "RESET ESTIMATED DATA OF PAPER SELECTION" is selected on the screen of FIG. 24F, the process of resetting estimated data and setting learned characteristic values of the type of printing medium to initial values is executed in step S2004. The process of step S2004 is similar to the above-described process of FIG. 25, and the characteristic values of a selected type of printing medium are reset to initial values in step S1803.

When "RESET PAPER INFORMATION" is selected on the screen of FIG. 24F, all data including characteristic values and history information is reset to initial values in step S2005. The process of step S2005 is similar to the above-described process of FIG. 26, and paper information set for the selected type of printing medium is reset to initial values in step S1903. Only the history information of the type of printing medium to be reset is deleted, and the history information of the other types of printing media remains stored.

When the process of step S2004 or step S2005 completes, the process proceeds to step S2006, and displays a screen for selecting whether to execute the resetting process on another type of printing medium. When reset is selected, the process returns to step S2001. When no reset is selected, the detailed settings screen (FIG. 24F) on the selected type of printing medium is displayed as in the case of step S2003, and the process is ended.

In the above description, characteristic values of a type of printing medium are set to initial values by the process of resetting estimated data, and characteristic values of a type of printing medium are set to initial values and history information is reset by the process of resetting printing medium information. By resetting characteristic values to initial values, a decrease in the accuracy of extracting candidates for a type of printing medium can be prevented, so inconvenience of a user can be reduced.

Alternatively, a process of resetting only history information may be executed. For example, when a person who uses the printing apparatus 100 has changed, it is conceivable that, even when candidates for a type of printing medium are displayed based on history information, types different from types of printing media that the new person frequently uses may be displayed as higher-level candidates. In such a case, when learned characteristic values of types of printing media are not reset and only history information is reset, a printing medium can be extracted with an increased accuracy, so the convenience of users improves.

Changes of characteristic values are reset and the characteristic values of printing media are set to initial values; however, changes do not need to be returned to initial values. For example, last changes or last several-time changes may be reset. The timing of resetting changes of characteristic values may be other than when a user inputs information for resetting. Reset may be performed, for example, when an environment in which the printing apparatus 100 is used has changed or when a user who uses the printing apparatus 100 has changed.

OTHER EMBODIMENTS

In the above-described embodiments, a specular reflection value, a diffused reflection value, and a paper thickness are acquired as characteristics, and a type of printing medium is extracted constantly based on those three characteristic values. However, in some cases, characteristics to be acquired may be changed. For example, the number of characteristics to be acquired may be reduced, and a type of printing medium may be extracted based on only a specular reflection value and a diffused reflection value. When sufficient learning is performed and reference characteristic values are sufficiently closer to measured values, it may be determined that a type of printing medium can be accurately extracted. In this case, the number of characteristics to be acquired is reduced. Since the number of characteristics for measured values to be acquired and compared with reference characteristic values reduces, the duration of the process can be reduced.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to embodiments of the present invention, there is a higher possibility that a type of printing medium can be accurately identified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-036835, filed Feb. 28, 2019, No. 2019-063890, filed Mar. 28, 2019, and No. 2019-068050, filed Mar. 29, 2019, which are hereby incorporated by reference herein in their entirety.

What is claimed is:

1. An information processing apparatus comprising:
   an acquisition unit configured to acquire a measurement result obtained by measuring a characteristic value of a printing medium with a measuring unit, wherein the printing medium is to be printed with a printing unit;
   a decision unit configured to decide a candidate for a type of the printing medium based on the acquired measurement result, and a reference characteristic value of each of types of printing media set in advance to identify a type of the measured printing medium;
   an input unit configured to input information associated with the printing medium type to be printed with the printing unit;
   a determination unit configured to determine whether to change the reference characteristic value of the printing medium type associated with the input information based on the measurement result of the printing medium and the printing medium type associated with the input information; and
   a change unit configured to change the reference characteristic value of the printing medium type,
   wherein, when the determination unit determines to change the reference characteristic value of the printing medium type associated with the input information, the change unit changes the reference characteristic value of the printing medium type associated with the input information based on the measurement result of the printing medium.

2. The information processing apparatus according to claim 1, wherein the change unit is configured to change the reference characteristic value of the printing medium type associated with the input information such that the reference characteristic value approaches the measurement result.

3. The information processing apparatus according to claim 2,
wherein the reference characteristic value set in advance for each of the printing media types is a value including an upper limit value and a lower limit value, and
wherein the change unit is configured to change the reference characteristic value such that a central value of the reference characteristic value approaches the measurement result.

4. The information processing apparatus according to claim 2,
wherein a correction value for changing the reference characteristic value set in advance for each of the printing media types to the reference characteristic value associated with a corresponding one of the printing media types is provided, and
wherein the change unit is configured to change the correction value.

5. The information processing apparatus according to claim 4,
wherein, in addition to the correction value, a common correction value for correcting characteristic values of types of a plurality of printing media is provided,
wherein a reference characteristic value associated with the printing medium type is calculated by correcting the reference characteristic value set in advance for each of the printing media types based on an associated correction value and the common correction value, and
wherein the change unit is configured to correct the characteristic values of types of a plurality of printing media based on the common correction value.

6. The information processing apparatus according to claim 1, wherein, when information associated with another one of the printing media types, different from the printing medium type of the candidate decided by the decision unit, is input by the input unit, the change unit changes the reference characteristic value of the another one of the printing media types associated with the input information.

7. The information processing apparatus according to claim 1, further comprising a notification control unit configured to cause a notification unit to provide information indicating the candidate for the printing medium type decided by the decision unit.

8. The information processing apparatus according to claim 7, wherein, of the printing media types of which the reference characteristic values are set in advance, the notification control unit is configured to cause the notification unit to preferentially provide information indicating the printing medium type of which the reference characteristic value is closer to the measurement result.

9. The information processing apparatus according to claim 8, wherein the notification control unit is configured to cause the notification unit to provide information indicating the printing media types, of which the reference characteristic values are set in advance, in order of closeness of the reference characteristic value to the measurement result.

10. The information processing apparatus according to claim 7, wherein the notification control unit is configured to preferentially provide the printing medium of which printed timing is closer, based on usage history information indicating the printing medium type printed with the printing unit.

11. The information processing apparatus according to claim 7,
wherein the reference characteristic value set in advance for each of the printing media types has a reference value, and
wherein the notification control unit is configured to cause the notification unit to provide information indicating the printing medium type having such a reference characteristic value that a difference between the measurement result and the reference value of the reference characteristic value is less than or equal to a first value.

12. The information processing apparatus according to claim 7,
wherein the reference characteristic value set in advance for each of the printing media types has a reference value, and
wherein the notification control unit is configured to cause the notification unit to provide information indicating the printing medium type having such a reference characteristic value that the measurement result falls within a first range including the reference value of the reference characteristic value.

13. The information processing apparatus according to claim 12, wherein the change unit is configured to expand or contract the first range of the printing medium type indicated by the input information based on the measurement result.

14. The information processing apparatus according to claim 13, wherein the change unit is configured to change one of an upper limit value and a lower limit value of the first range.

15. The information processing apparatus according to claim 13, wherein, when the measurement result falls within the first range, the change unit contracts the first range in a direction toward the measurement result such that the measurement result is included.

16. The information processing apparatus according to claim 12, wherein, when the measurement result falls within a second range that includes the reference value of the printing medium type indicated by the input information and that is a range wider than or equal to the first range, the determination unit determines to cause the change unit to change the reference characteristic value of the printing medium type associated with the input information.

17. The information processing apparatus according to claim 16, wherein, when the measurement result falls outside the first range of the printing medium type indicated by the input information and falls within the second range, the change unit expands the first range in a direction toward the measurement result.

18. The information processing apparatus according to claim 16, wherein the change unit is configured to change an upper limit value and a lower limit value of the second range.

19. The information processing apparatus according to claim 7, wherein, when candidate information associated with the candidate for the printing medium type, which the notification control unit has caused the notification unit to provide, is input by the input unit, the determination unit determines to cause the change unit to change the reference characteristic value of the printing medium type associated with the candidate information input by the input unit.

20. The information processing apparatus according to claim 7, wherein the notification control unit is configured to cause the notification unit to provide a name of the printing medium.

21. The information processing apparatus according to claim 1, wherein the change unit is configured to change a reference value of the reference characteristic value of the printing medium type such that the reference value approaches the measurement result by a predetermined percentage.

22. The information processing apparatus according to claim 1, wherein the change unit sets an average of the measurement results when the information associated with the printing medium type is input by the input unit for the reference characteristic value associated with the printing medium type.

23. The information processing apparatus according to claim 1, wherein the characteristic value of the printing medium, which the measuring unit measures, includes at least one of a diffused reflection value, specular reflection value, and thickness value of the printing medium.

24. The information processing apparatus according to claim 1, wherein, based on the measurement result, the change unit changes a type of a characteristic value of a measurement result that the acquisition unit acquires.

25. The information processing apparatus according to claim 1, wherein the input unit is configured to input information indicating that the reference characteristic value changed by the change unit is reset.

26. The information processing apparatus according to claim 25, wherein, when, for a predetermined one of the printing media types, information indicating that the reference characteristic value changed by the change unit is reset is input by the input unit, the change unit executes a process of resetting the reference characteristic value changed by the change unit for the predetermined one of the printing media types.

27. The information processing apparatus according to claim 25,
wherein the information indicating that the changed reference characteristic value is reset is reset information indicating that all the reference characteristic values changed by the change unit are reset, and
wherein, when the reset information is input by the input unit, the change unit resets all the reference characteristic values changed by the change unit.

28. The information processing apparatus according to claim 1,
wherein the input unit is configured to input information about a printing apparatus including the printing unit for controlling the printing apparatus and information indicating that changed information about the printing apparatus is reset,
wherein, when the information about the printing apparatus is input by the input unit, the change unit changes the information about the printing apparatus in accordance with the input information and sets the changed information, and
wherein, when the information indicating that the changed information about the printing apparatus is reset is input by the input unit, the change unit resets the information about the printing apparatus.

29. The information processing apparatus according to claim 1, wherein the input unit is configured to input information to reset usage history information indicating the printing medium type that has been printed with the printing unit.

30. The information processing apparatus according to claim 29, wherein, when the information to reset the usage history information is input by the input unit, the change unit deletes the usage history information.

31. The information processing apparatus according to claim 1, further comprising:
the printing unit, wherein the printing unit is configured to apply a recording agent to the printing medium; and
a conveyance unit configured to convey the printing medium to a position where printing is performed,
wherein, when the conveyance unit conveys the printing medium to a position where the printing unit is able to print, the printing unit prints on the printing medium.

32. The information processing apparatus according to claim 31, further comprising
a carriage loaded with the printing unit and configured to be movable,
wherein the measuring unit is mounted on the carriage and is configured to measure a characteristic value of the printing medium conveyed by the conveyance unit to a position where the measuring unit is able to perform measurement.

33. A method for an information processing apparatus, the method comprising:
measuring a characteristic value of a printing medium to be printed with a printing unit;
extracting a candidate for a type of the printing medium measured based on the characteristic value, and a reference characteristic value set in advance for each of types of printing media to identify a type of the measured printing medium;
inputting information associated with the printing medium type to be printed with the printing unit;
changing the reference characteristic value of the printing medium type associated with the information input in determining the printing medium type, based on the characteristic value; and
determining whether to change the reference characteristic value of the printing medium type based on the characteristic value and the printing medium type associated with the information input in determining the printing medium type.

34. A non-transitory computer-readable storage medium storing a program for causing a computer to execute a method for an information processing apparatus, the method comprising:
acquiring a measurement result obtained by measuring a characteristic value of a printing medium to be printed with a printing unit;
extracting a candidate for a type of the printing medium measured based on an acquired measurement result, and a reference characteristic value set in advance for each of types of printing media to identify a type of the measured printing medium;
inputting information associated with the printing medium type to be printed with the printing unit;
changing the reference characteristic value of the printing medium type associated with the information input in determining the printing medium type, based on the measurement result; and
determining whether to change the reference characteristic value of the printing medium type based on the measurement result and the printing medium type associated with the information input in determining the printing medium type.

* * * * *